(12) United States Patent
Ogawa et al.

(10) Patent No.: US 11,654,658 B2
(45) Date of Patent: May 23, 2023

(54) LAMINATED GLASS

(71) Applicant: NIPPON SHEET GLASS COMPANY, LIMITED, Tokyo (JP)

(72) Inventors: Ryohei Ogawa, Tokyo (JP); Kazuki Chiba, Tokyo (JP); Hisashi Ogawa, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 1122 days.

(21) Appl. No.: 16/303,435

(22) PCT Filed: May 25, 2017

(86) PCT No.: PCT/JP2017/019518
§ 371 (c)(1),
(2) Date: Nov. 20, 2018

(87) PCT Pub. No.: WO2017/204291
PCT Pub. Date: Nov. 30, 2017

(65) Prior Publication Data
US 2020/0316917 A1    Oct. 8, 2020

(30) Foreign Application Priority Data

May 26, 2016 (JP) .............................. JP2016-105185
Aug. 10, 2016 (JP) .............................. JP2016-158277

(51) Int. Cl.
*B32B 17/10* (2006.01)
*B32B 7/12* (2006.01)
(Continued)

(52) U.S. Cl.
CPC .......... *B32B 17/10385* (2013.01); *B32B 7/12* (2013.01); *B32B 17/10036* (2013.01);
(Continued)

(58) Field of Classification Search
CPC ........ B32B 17/10385; B32B 17/10036; B32B 17/10165; B32B 17/10348;
(Continued)

(56) References Cited

U.S. PATENT DOCUMENTS 6,559,419 B1    5/2003  Sol et al.
2004/0200821 A1  10/2004  Voeltzel
(Continued)

FOREIGN PATENT DOCUMENTS

EP    1 908 584 A1     4/2008
EP    1908584 A1 *    4/2008  ............. B32B 15/08
(Continued)

OTHER PUBLICATIONS

International Search Report issued PCT/JP2017/019518 (PCT/ISA/210), dated Aug. 8, 2017.
(Continued)

*Primary Examiner* — Shawntina T Fuqua
(74) *Attorney, Agent, or Firm* — Birch, Stewart, Kolasch & Birch, LLP

(57) ABSTRACT

A laminated glass according to the present invention includes: a first glass plate having a rectangular shape, and including a first side and a second side opposing the first side; a second glass plate arranged opposing the first glass plate, and having substantially the same shape as the shape of the first glass plate; an intermediate film arranged between the first glass plate and the second glass plate; a first bus bar extending along an end portion closer to the first side; a second bus bar extending along an end portion closer to the second side; and a plurality of heating lines extending so as to connect the first bus bar and the second bus bar to each other, wherein at least some of the plurality of heating lines are heating lines having different lengths.

19 Claims, 19 Drawing Sheets

(51) Int. Cl.
*B60J 1/02* (2006.01)
*B60S 1/02* (2006.01)
*H05B 3/28* (2006.01)
*H05B 3/86* (2006.01)

(52) U.S. Cl.
CPC ................ *B60J 1/02* (2013.01); *B60S 1/026* (2013.01); *H05B 3/283* (2013.01); *H05B 3/86* (2013.01); *B32B 2605/00* (2013.01); *H05B 2203/011* (2013.01); *H05B 2203/013* (2013.01); *H05B 2214/02* (2013.01)

(58) Field of Classification Search
CPC ........ B32B 17/10743; B32B 17/10761; B32B 17/10788; B32B 7/12; B32B 2605/00; B32B 2307/102; B60J 1/02; B60J 1/20; B60S 1/026; B60S 1/02; H05B 3/283; H05B 3/86; H05B 3/02; H05B 2203/011; H05B 2203/013; H05B 2214/02
See application file for complete search history.

(56) References Cited

U.S. PATENT DOCUMENTS

| | | | |
|---|---|---|---|
| 2013/0213949 A1 | 8/2013 | Lisinski et al. | |
| 2017/0015180 A1 | 1/2017 | Sakamoto | |
| 2021/0001695 A1* | 1/2021 | Ogawa | B32B 7/12 |
| 2022/0279628 A1* | 9/2022 | Sadakane | B60J 1/001 |

FOREIGN PATENT DOCUMENTS

| | | | | |
|---|---|---|---|---|
| EP | 2 574 142 A1 | 3/2013 | | |
| EP | 3 505 405 A1 | 7/2019 | | |
| EP | 3 572 386 A1 | 11/2019 | | |
| JP | 2000021890 A | * 1/2000 | ............ | C30B 15/14 |
| JP | 2000-77173 A | 3/2000 | | |
| JP | 2012-14945 A | 1/2012 | | |
| JP | 2013-541807 A | 11/2013 | | |
| JP | 2016222524 A | * 12/2016 | ............... | B32B 1/00 |
| WO | WO 2015/137518 A1 | 9/2015 | | |
| WO | WO 2015/170771 A1 | 11/2015 | | |
| WO | WO-2015170771 A1 | * 11/2015 | ....... | B32B 17/10036 |
| WO | WO 2015/186839 A1 | 12/2015 | | |

OTHER PUBLICATIONS

Written Opinion of the International Searching Authority issued PCT/JP2017/019518 (PCT/ISA/237), dated Aug. 8, 2017.
Japanese Office Action for corresponding Japanese Application No. 2018-519604, dated Feb. 8, 2022, with English translation.
Japanese Office Action for corresponding Japanese Application No. 2018-519604, dated Jun. 8, 2021, with English translation.
Extended European Search Report dated Apr. 6, 2020, for counterpart European Application No. 17802877.5.
Japanese Office Action issued in Patent Application No. 2018-519604 dated Jul. 19, 2022.
European Office Action for European Application No. 17 802 877.5, dated Sep. 5, 2022.

* cited by examiner

LAMINATED GLASS

TECHNICAL FIELD

The present invention relates to laminated glass.

BACKGROUND ART

A windshield of an automobile may fog on a cold day or in a cold climate area, and this fogging may cause trouble when driving. To address this, a variety of methods of defogging the windshield have been proposed. For example, Patent Document 1 discloses bus bars and heating lines arranged inside a windshield to defog the windshield using heat generated by the heating lines.

CITATION LIST

Patent Literature

Patent Literature 1: JP 2000-77173A.

SUMMARY OF INVENTION

Technical Problem

Laminated glass such as one used in an ordinary windshield is formed into a trapezoidal shape whose lower side is longer than the upper side thereof. For this reason, the area to be heated is wider around the lower side. However, in the aforementioned Patent Document 1, a bus bar closer to the upper side and a bus bar closer to the lower side have the same length in the horizontal direction, and thus, the lower bus bar is not arranged over the entire lower side of the windshield. Since the heating lines are arranged to connect these bus bars to each other, the heating lines are not arranged on both sides of the lower side of the windshield. For this reason, the windshield cannot be defogged.

Moreover, there is also the following problem. Depending on the type of automobile, the air from a defroster may not reach both end portions of the windshield. Nevertheless, with the aforementioned conventional technique, both end portions of the windshield cannot be heated by the heating lines in the case of such a type of automobile. Furthermore, when snow is cleared with a wiper, the snow is accumulated in both end portions of the windshield, but these end portions cannot be deiced.

The invention has been made to solve the foregoing problems, and aims to provide laminated glass capable of preventing fogging over the entire glass even in the case of trapezoidal laminated glass with a long lower side.

Solution to Problem

A first aspect of laminated glass according to the present invention includes: a first glass plate having a rectangular shape, and including a first side and a second side opposing the first side; a second glass plate arranged opposing the first glass plate, and having substantially the same shape as the shape of the first glass plate; and an intermediate film arranged between the first glass plate and the second glass plate, the intermediate film including: a first bus bar extending along an end portion closer to the first side; a second bus bar extending along an end portion closer to the second side; and a plurality of heating lines extending so as to connect the first bus bar and the second bus bar to each other, wherein at least some of the plurality of heating lines are heating lines having different lengths.

However, not all of the plurality of heating lines may be heating lines with different lengths. For example, some of the plurality of heating lines may have a length that differs from the length of the other ones of the plurality of heating lines.

In the above-described laminated glass, at least some of the heating lines having a longer length can have a width larger than the width of the heating lines having a shorter length.

In the above-described laminated glass, the intermediate film can further include: an adhesion layer; and a heat-generating layer including at least the heating lines, the heat-generating layer being in contact with the adhesion layer or arranged inward of the adhesion layer, and the adhesion layer can be formed with a material capable of deforming to follow the shape of the heating lines.

In the above-described laminated glass, the heat-generating layer can include a sheet-shaped base that supports at least the heating lines, and the heat-generating layer can be arranged inward of the adhesion layer.

In the above-described laminated glass, the thickness of the adhesion layer can be at least larger than the thickness of the heating lines.

In the above-described laminated glass, the thickness of the adhesion layer can be 0.5 mm or larger.

In the above-described laminated glass, faces of the plurality of heating lines, the faces coming into contact with the adhesion layer, can be formed flatly.

In the above-described laminated glass, the thickness of the plurality of heating lines can be fixed between the first and second bus bars.

In the above-described laminated glass, at least one of the length and width of the plurality of heating lines and the space therebetween can differ so that a plurality of regions with different amounts of heat generation are formed in a first direction in which the first side and the second side face each other, between the first bus bar and the second bus bar.

In the above-described laminated glass, each of the heating lines can have a plurality of portions with different widths in a length direction, and the curvature radius at corners of a connecting region between adjacent ones of the plurality of portions, the corners being formed at both side edges of a wider portion, can be 1 μm or smaller.

In the above-described laminated glass, each of the heating lines can have a plurality of portions with different widths in a length direction, and the curvature radius at corners of a connecting region between adjacent ones of the plurality of portions, the corners being formed by both side edges of a narrower portion and a wider portion, can be 1 μm or larger.

In the above-described laminated glass, each of the portions can be formed so that the width changes in the length direction.

In the above-described laminated glass, the intermediate film further can further include: an adhesion layer; and a heat-generating layer including at least the heating lines, the heat-generating layer being arranged inward of the adhesion layer, and the adhesion layer can be formed with a material capable of deforming to follow the shape of the heating lines.

In the above-described laminated glass, the first glass plate, the second glass plate, and the intermediate film can include: an information acquisition region arranged closer to the first side and opposing an information acquisition device for acquiring information from outside of a vehicle by emitting and/or receiving light, the light passing through the information acquisition region; a central region between the information acquisition region and the second side; and side regions on both sides of the information acquisition region, between the first side and the second side, the length of the heating lines arranged in the central region can be shorter than the length of the heating lines arranged in the side regions, and the width of the heating lines arranged in the central region can be larger than the width of the heating lines arranged in the side regions.

In the above-described laminated glass, the central region can include a plurality of portions with different amounts of heat generation, the plurality of portions being arranged in a first direction in which the first side and the second side face each other, and, of the plurality of portions, a portion on the information acquisition region side can have an amount of heat generation larger than that of a portion closer to the second side.

In the above-described laminated glass, each of the heating lines can have a plurality of portions with different widths in a length direction, and the curvature radius at corners of a connecting region between adjacent ones of the plurality of portions, the corners being formed at both side edges of a wider portion, can be 1 µm or larger.

In the above-described laminated glass, each of the heating lines can have a plurality of portions with different widths in a length direction, and the curvature radius at corners of a connecting region between adjacent ones of the plurality of portions, the corners being formed by both side edges of a narrower portion and a wider portion, can be 1 µm or larger.

In the above-described laminated glass, each of the portions can be formed so that the width changes in the length direction.

In the above-described laminated glass, the intermediate film can further include: an adhesion layer; and a heat-generating layer including at least the heating lines, the heat-generating layer being arranged inward of the adhesion layer, and the adhesion layer can be formed with a material capable of deforming to follow the shape of the heating lines.

In the above-described laminated glass, of the first bus bar, a first portion corresponding at least to the information acquisition region can be arranged closer to the second side than the information acquisition region.

In the above-described laminated glass, the first bus bar can include the first portion and second portions corresponding to the side regions, and the second portions can be arranged closer to the first side than the first region.

In the above-described laminated glass, of the first bus bar, a first portion corresponding at least to the information acquisition region can be arranged closer to the first side than the information acquisition region.

In the above-described laminated glass, the first bus bar can be formed along the first side.

In the above-described laminated glass, the second sides of the first glass plate and the second glass plate can be formed longer than the first sides, the first bus bar, the second bus bar, and the plurality of heating lines can be arranged between the first glass plate and the second glass plate, at least one of spaces between adjacent ones of the heating lines can be narrower on the first bus bar side than on the second bus bar side, and the line width of at least one of the heating lines can be larger on the first bus bar side than on the second bus bar side.

In the above-described laminated glass, at least some of the plurality of heating lines can be formed so that the line width gradually decreases from the first bus bar side toward the second bus bar side.

In the above-described laminated glass, each of the first glass plate, the second glass plate, and the intermediate film can be constituted by a plurality of regions, and the largest line width of the plurality of heating lines can differ between the regions.

In the above-described laminated glass, the plurality of regions can include: a first region that is a test region A defined by JIS R3212; a second region that is a test region B defined by JIS R3212; a third region opposing an information acquisition device for acquiring information from outside of a vehicle by emitting and/or receiving light, the light passing through the third region; and a fourth region that is a region other than the first to third regions.

In the above-described laminated glass, the plurality of regions can include at least a region through which a wiper passes and a region through which the wiper does not pass.

In the above-described laminated glass, an information acquisition device for acquiring information from outside the vehicle by emitting and/or receiving light can be arranged, and the plurality of regions can include: a first region serving as a test region A defined by JIS R3212; a second region serving as a test region B defined by JIS R3212; a third region in which the light is emitted and/or received by the information acquisition device; and a fourth region that is a region other than the first to third regions.

In the above-described laminated glass, at least a pair of adjacent heating lines can further comprise at least one bypass heating line that connects the pair of adjacent heating lines.

In the above-described laminated glass, the first bus bar, the second bus bar, and the plurality of heating lines can be integrally formed with the same material.

In the above-described laminated glass, the line width of the heating lines can be 500 µm or smaller.

In the above-described laminated glass, the first side can be an upper side or a lower side.

The above-described laminated glass can further include: an obstructing region for obstructing a field of view, the obstructing region being provided in at least one of a first face and a second face of the first glass plate and a first face and a second face of the second glass plate, wherein the first and second bus bars can be arranged at positions overlapping the obstructing region.

In the above-described laminated glass, the obstructing region can be at least partially arranged at a periphery of the laminated glass.

In the above-described laminated glass, in a connecting portion between the bus bars and the heating lines, the width of the heating lines can be formed wider than that in another portion.

Second laminated glass according to the present invention includes: a first glass plate having a rectangular shape, and including a first side and a second side opposing the first side and being longer than the first side; a second glass plate arranged opposing the first glass plate, and having substantially the same shape as the shape of the first glass; and an intermediate film arranged between the first glass plate and the second glass plate, the intermediate film comprising: a first bus bar extending along an end portion closer to the upper side; and a second bus bar extending along an end portion closer to the lower side; and a plurality of heating lines extending while connecting the first bus bar and the second bus bar to each other, a space between adjacent ones of the heating lines is narrower on the first bus bar side than on the second bus bar side, and the line width of the heating lines is larger on the first bus bar side than on the second bus bar side.

In the above laminated glass, the heating lines can be formed so that the line width thereof gradually decreases from the first bus bar side toward the second bus bar side.

A configuration can be employed in which the above laminated glass is constituted by a plurality of areas, and the largest line width of the plurality of heating lines differs between the areas.

Advantageous Effects of Invention

According to the present invention, fogging can be prevented over the entire glass even in the case of trapezoidal laminated glass with a long lower side.

DESCRIPTION OF EMBODIMENTS

Figure 1:
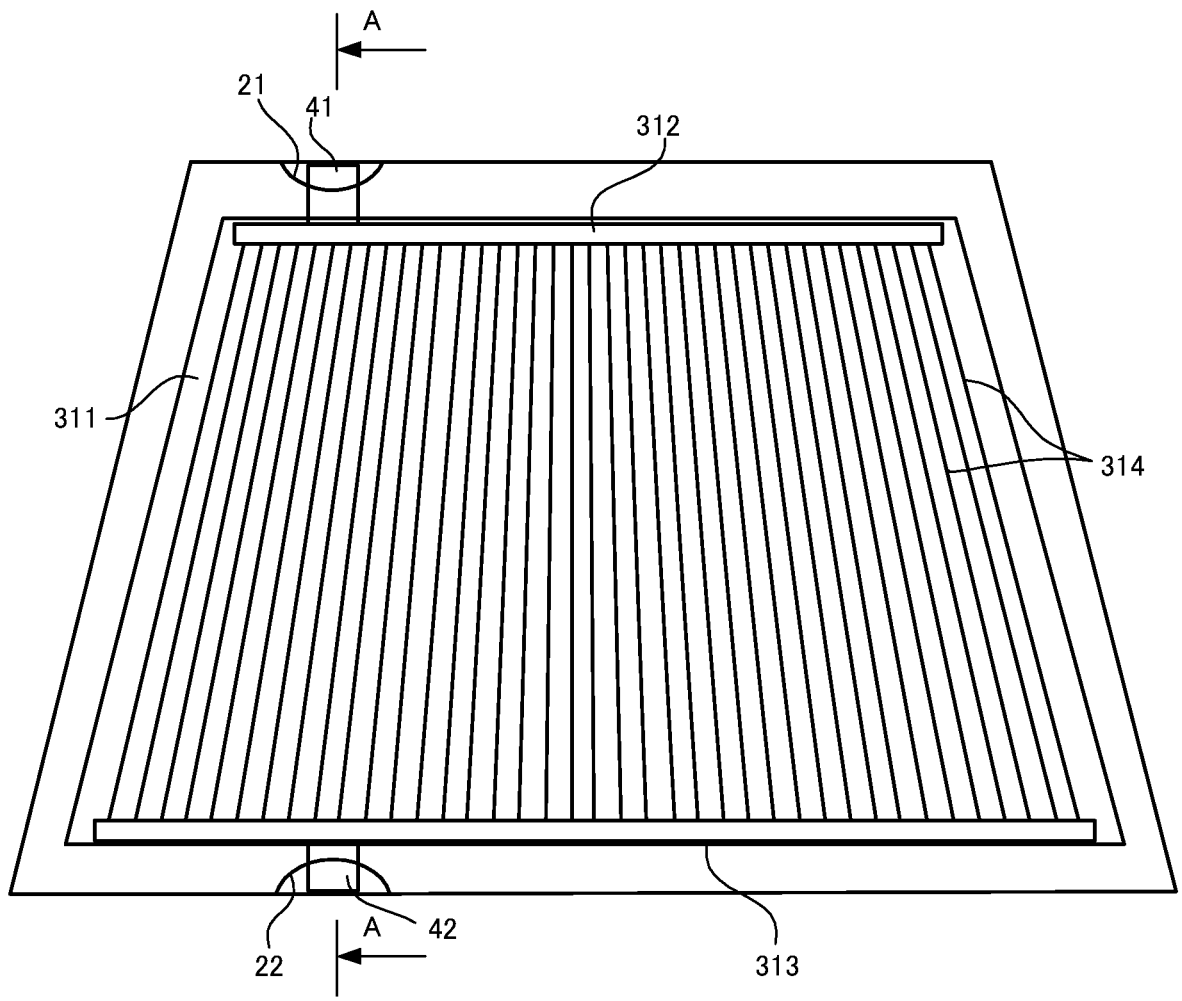
FIG. 1 is a front elevational view in an embodiment in which laminated glass according to the present invention is applied to a windshield.
Figure 2:
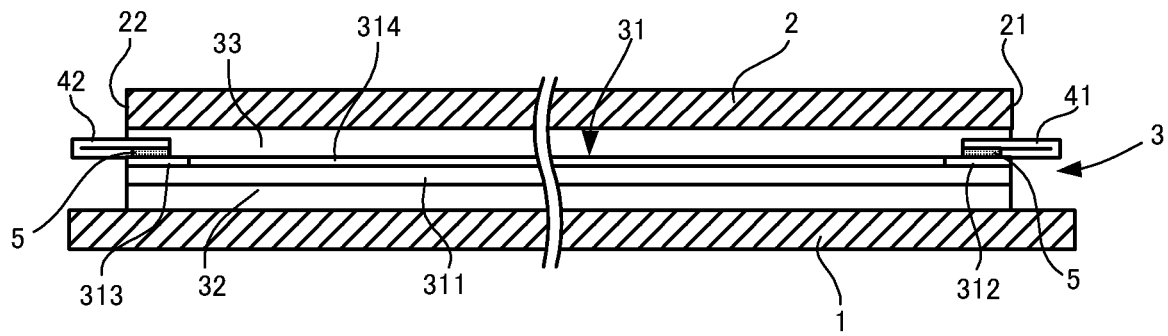
FIG. 2 is a cross-sectional view taken along a line A-A in FIG. 1.

Hereinafter, a description will be given, with reference to the drawings, of an embodiment in which laminated glass according to the present invention is applied to a windshield. FIG. 1 is a plan view of a windshield according to this embodiment, and FIG. 2 is a cross-sectional view of FIG. 1. As shown in FIGS. 1 and 2, the windshield according to this embodiment includes an outer glass plate (second glass plate) 1, an inner glass plate (first glass plate) 2, and an intermediate film 3, which is arranged between these glass plates 1 and 2. Cutout portions 21 and 22 are formed in an upper end portion and a lower end portion, respectively, of the inner glass plate 2. Connecting members 41 and 42, which extend from the intermediate film 3, are exposed from the cutout portions 21 and 22, respectively. Each member will be described below.

1. Summary of Laminated Glass 1-1. Glass Plate

Both glass plates 1 and 2 are formed into a trapezoidal shape whose lower side is longer than the upper side, and arc-shaped cutout portions are formed in the upper end portion and the lower end portion of the inner glass plate 2, as mentioned above. In the following description, the cutout portion formed in the upper end portion of the inner glass plate 2 will be referred to as a first cutout portion 21, and the cutout portion formed in the lower end portion will be referred to as a second cutout portion 22. The glass plates 11 and 12 can be known glass plates, and can also be formed with heat absorbing glass, ordinary clear glass or green glass, or UV green glass. However, these glass plates 11 and 12 need to achieve visible light transmittance conforming to the safety standards in the country in which an automobile is used. For example, an adjustment can be made so that a required solar absorptivity is ensured in the outer glass plate 11, and the visible light transmittance satisfies the safety standards with the inner glass plate 12. Examples of compositions of clear glass, heat absorbing glass, and soda-lime glass are listed below.

Clear Glass
$SiO_2$: 70 to 73 mass %
$Al_2O_3$: 0.6 to 2.4 mass %
CaO: 7 to 12 mass %
MgO: 1.0 to 4.5 mass %
$R_2O$: 13 to 15 mass % (R denotes alkali metal)
Total iron oxide (T-$Fe_2O_3$) expressed in terms of $Fe_2O_3$: 0.08 to 0.14 mass %

Heat Absorbing Glass
The composition of heat absorbing glass can be, for example, a composition that is based on the composition of clear glass, where the proportion of total iron oxide (T-Fe$_2$O$_3$) expressed in terms of Fe$_2$O$_3$ is 0.4 to 1.3 mass %, the proportion of CeO$_2$ is 0 to 2 mass %, the proportion of TiO$_2$ is 0 to 0.5 mass %, and the skeletal component (primarily, SiO$_2$ and Al$_2$O$_3$) of glass is reduced by the increased amount of T-Fe$_2$O$_3$, CeO$_2$, and TiO$_2$.
Soda-Lime Glass
SiO$_2$: 65 to 80 mass %
Al$_2$O$_3$: 0 to 5 mass %
CaO: 5 to 15 mass %
MgO: 2 mass % or more
NaO: 10 to 18 mass %
K$_2$O: 0 to 5 mass %
MgO+CaO: 5 to 15 mass %
Na$_2$O+K$_2$O: 10 to 20 mass %
SO$_3$: 0.05 to 0.3 mass %
B$_2$O$_3$: 0 to 5 mass %
Total iron oxide (T-Fe$_2$O$_3$) expressed in terms of Fe$_2$O$_3$: 0.02 to 0.03 mass %

As described above, the glass plates 1 and 2 are formed into a trapezoidal shape, and the length ratio between the upper side and the lower side can be, for example, 1:1.04 to 1:1.5. For example, if the length of the upper side is 1200 mm, the length of the lower side can be 1250 to 1800 mm. Specifically, the length of the upper side can be 1195 mm, and the length of the lower side can be 1435 mm. Note that the aforementioned ratio is a ratio in a two-dimensional plane when the windshield is projected from the front side. That is to say, although FIG. 1 illustrates an example in which the lower side is longer, the present invention can also be applied to a windshield whose upper side is longer. For example, in the case of a windshield for a compact car for one person's use, if the length of the upper side is 500 mm, the length of the lower side can be 350 to 450 mm. Specifically, the length of the upper side may be 500 mm, and the length of the lower side may be 425 mm.

The thickness of the laminated glass according to this embodiment is not particularly limited. However, from the viewpoint of weight reduction, the total thickness of the outer glass plate 1 and the inner glass plate 2 is preferably 2.4 to 4.6 mm, more preferably 2.6 to 3.4 mm, and particularly preferably 2.7 to 3.2 mm. Since the total thickness of the outer glass plate 1 and the inner glass plate 2 thus needs to be reduced for weight reduction, the respective thicknesses of the outer glass plate 11 and the inner glass plate 12, which are not particularly limited, can be determined as follows, for example.

The outer glass plate 1 principally needs durability and shock resistance against an external obstacle. For example, in the case of using this laminated glass as an automobile windshield, shock resistance against a flying object, such as a small stone, is needed. Meanwhile, the larger the thickness, the larger the weight, which is not favorable. From this viewpoint, the thickness of the outer glass plate 1 preferably is 1.0 to 3.0 mm, and more preferably is 1.6 to 2.3 mm. The thickness to be employed can be determined in accordance with the usage of the glass.

The thickness of the inner glass plate 2 can be made equal to that of the outer glass plate 1, but can alternatively be made smaller than the thickness of the outer glass plate 11 for the reduction in the weight of the laminated glass, for example. Specifically, giving consideration to the glass strength, the thickness of the inner glass plate 2 is preferably 0.6 to 2.0 mm, more preferably 0.8 to 1.8 mm, and particularly preferably 1.0 to 1.6 mm. Furthermore, the thickness of the inner glass plate 2 is preferably 0.8 to 1.3 mm. The thickness of the inner glass plate 2 to be employed can also be determined in accordance with the usage of glass.

Figure 3:
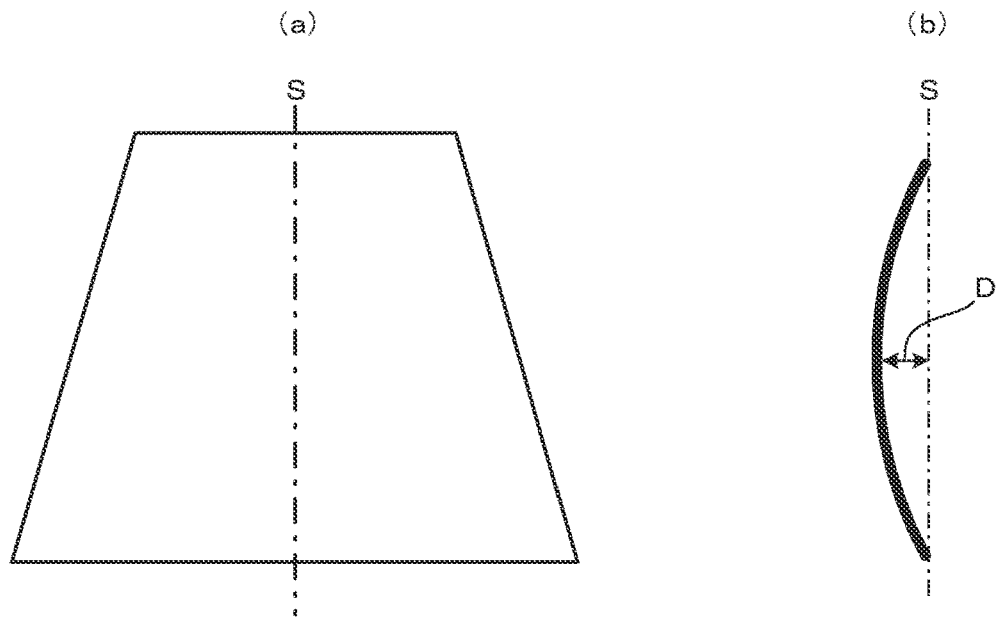
FIGS. 3(a) and 3(b) are a front elevational view and a cross-sectional view, respectively, indicating a cross-curvature of curved laminated glass.

The shape of the outer glass plate 1 and the inner glass plate 2 according to this embodiment may also be a curved shape. However, if the glass plates 1 and 2 have a curved shape, it is considered that the larger the cross-curvature, the lower the sound insulating property is. The cross-curvature refers to the amount indicating the curvature of a glass plate. For example, when a line L that connects the center of an upper side of a glass plate to the center of a lower side is set as shown in FIG. 3, the largest distance between the line L and the glass plate is defined as a cross-curvature D.

Figure 4:
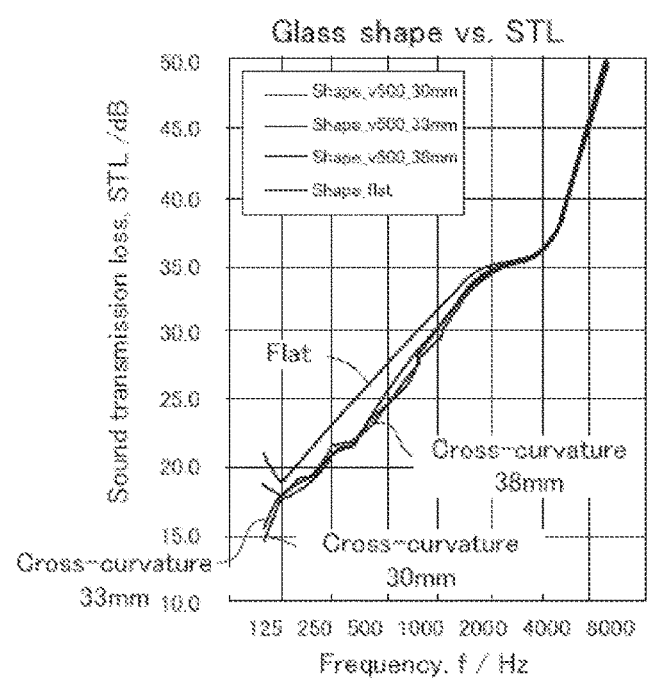
FIG. 4 is a graph indicating typical relationships between frequency and sound transmission loss in a curved glass plate and a flat glass plate.

FIG. 4 is a graph indicating general relationships between frequency and sound transmission loss in curved glass plates and a flat glass plate. It can be understood from FIG. 4 that there is no significant difference in sound transmission loss (STL) between the curved glass plates in the range of the cross-curvature from 30 to 38 mm, but the sound transmission loss of the curved glass plates is lower than that of the flat glass plate in a frequency band of 4000 Hz and smaller. Accordingly, in the case of producing a curved glass plate, a glass plate with a smaller cross-curvature is favorable. Specifically, the cross-curvature is preferably less than 30 mm, more preferably smaller than 25 mm, and particularly preferably smaller than 20 mm.

Figure 5:
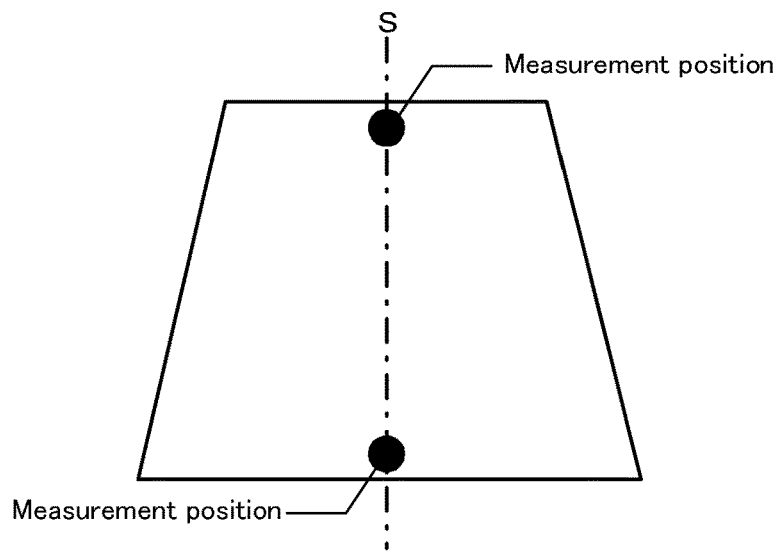
FIG. 5 is a schematic plan view indicating positions for measuring the thickness of the laminated glass.

A description will now be given of an example of a method of measuring the thickness in the case where a glass plate is curved. First, measurement is performed at two positions, namely an upper position and a lower position on a center line S that extends in the up-down direction, passing through the center of the glass plate in the left-right direction, as shown in FIG. 5. The measurement instrument is not particularly limited, but can be a thickness gauge, such as the SM-112 manufactured by Teclock Corporation, for example. During measurement, the glass plate is arranged so that the curved face thereof is placed on a flat face, and measurement is performed while holding an end portion of the glass plate using the aforementioned thickness gauge.

1-2. Intermediate Film

Next, the intermediate film 3 will be described. The intermediate film 3 is constituted by three layers, which are a heat-generating layer 31, and a pair of adhesion layers 32 and 33 that sandwich the heat-generating layer 31. In the following description, the adhesion layer arranged on the outer glass plate 1 side will be referred to as a first adhesion layer 32, and the adhesion layer arranged on the inner glass plate 2 side will be referred to as a second adhesion layer 33.

1-2-1. Heat-Generating Layer

First, the heat-generating layer 31 will be described. The heat-generating layer 31 includes a sheet-shaped base 311, as well as a first bus bar 312, a second bus bar 313, and a plurality of heating lines 314, which are arranged on the base 311. The base 311 can be formed into a trapezoidal shape so as to correspond to the shape of the glass plates 1 and 2, but does not necessarily have to have the same shape as the shape of the glass plates 1 and 2, and may also be smaller than the glass plates 1 and 2. For example, as shown in FIG. 1, the length of the base 311 in the up-down direction may be shorter than the length between the cutout portions 21 and 22 of the inner glass plate 2 so that the base 311 does not interfere with the cutout portions 21 and 22. Also, the length of the base 311 in the left-right direction may also be shorter than the width of the glass plates 1 and 2.

The first bus bar 312 is formed to extend along an upper side of the base 311. Meanwhile, the second bus bar 313 is formed to extend along a lower side of the base 311, and is formed longer than the first bus bar 312. However, the bus bars 312 and 313 are arranged inward of the aforementioned cutout portions 21 and 22, respectively, so as not to be exposed from the cutout portions 21 and 22 when the intermediate film 3 is sandwiched between the glass plates 1 and 2. Note that the widths of the bus bars 312 and 313 in the up-down direction are preferably 5 to 50 mm, and more preferably 10 to 30 mm, for example. This is because, if the width of the bus bars 312 and 313 is smaller than 5 mm, there is a concern that a "heat spot" phenomenon will occur and more heat will be generated therefrom than from the heating lines, and, on the contrary, if the width of the bus bars 312 and 313 is larger than 50 mm, there is a concern that the field of view will be interrupted by the bus bars 312 and 313. The bus bars 312 and 313 do not have to be formed accurately along the base 311. That is to say, the bus bars 312 and 313 do not have to be completely parallel to end edges of the base 311, and can also be curved, for example.

Figure 6:
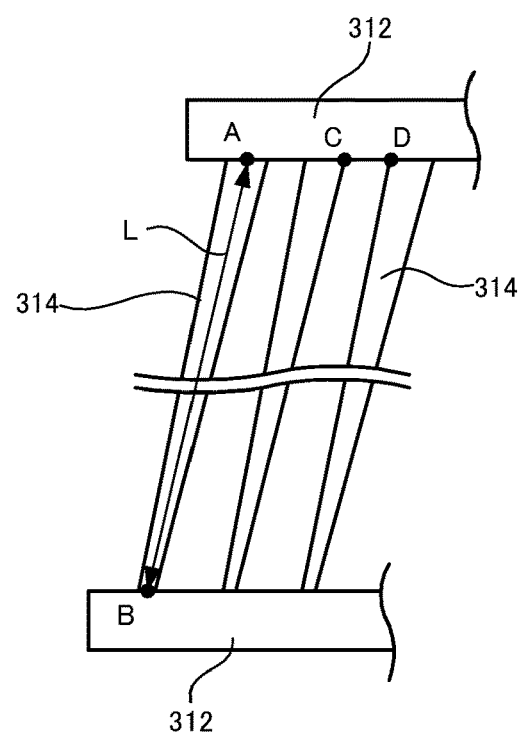
FIG. 6 is an enlarged view of heating lines.

The plurality of heating lines 314 are formed to extend in the up-down direction so as to connect the bus bars 312 and 313 to each other. Since the first bus bar 312 and the second bus bar 313 have different lengths, the plurality of heating lines 314 are arranged so that the space between adjacent heating lines 314 expands downward, as shown in FIG. 6. The width of the heating lines 314 gradually decreases from the first bus bar 312 side toward the second bus bar 313 side. Specifically, the line width of the heating lines 314 and the spaces therebetween can be set as follows. That is to say, the line width of each heating line 314 is preferably 3 to 500 μm, more preferably 5 to 20 μm, and particularly preferably 8 to 10 μm. The ratio between the width of an upper end of each heating line 314 connected to the first bus bar 312 and the width of a lower end connected to the second bus bar 313 can be 1:0.67 to 1:0.96, for example.

The space between two adjacent heating lines 314 is preferably 1 to 4 mm, more preferably 1.25 to 3 mm, and particularly preferably 1.25 to 2.5 mm. The ratio of the space between upper ends of two adjoining heating lines 314 connected to the first bus bar 312 and the space between lower ends connected to the second bus bar 313 can be 1:1.04 to 1:1.5, for example.

Note that each heating line 314 may be formed into a straight line, or any of a variety of shapes, such as a wave shape. Particularly, by forming each heating line 314 into a sine wave shape, the heat distribution can be made uniform, and the heating lines 314 can be prevented from optically interrupting the field of view of the windshield.

As shown in FIG. 6, the length L of each heating line 314 refers to the distance between an intersection point A between the heating line 314 and the first bus bar 312 and an intersection point B between the heating line 314 and the second bus bar 313. The "intersection points" here refer to intersection points between the substantial center of each heating line 314 in the width direction and the bus bars 312 and 313. Even if the heating line 314 has a wave shape, the distance of the heating line 314 refers to the distance between the intersection points A and B, as mentioned above. This is because, even if the heating line 314 has a wave shape, the length of the heating line 314 when being straightened is proportional to the distance between the intersection points A and B.

Meanwhile, the width of each heating line 314 can be measured using a microscope, such as the VHX-200 manufactured by Keyence Corporation, at a magnification ratio of 1000, for example. Note that the cross-sectional area of each heating line 314 affects the amount of heat generation in practice, but the width and the cross-sectional area technically have substantially the same meaning. The smaller the width, the more difficult it is to visually recognize the heating lines 314, and thus, the heating lines 314 with a smaller width are suitable for the windshield according to this embodiment.

Figure 7:
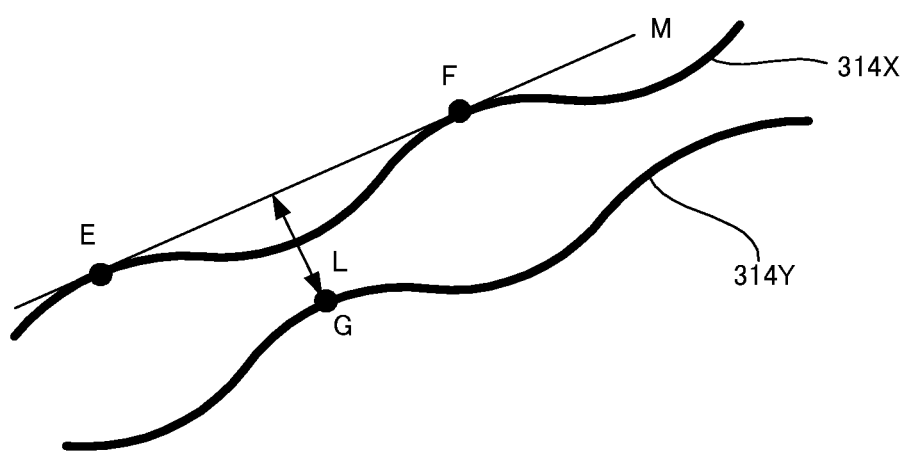
FIG. 7 illustrates measurement of a gap between the heating lines.

For example, if the heating lines 314 are straight, the space between two adjacent heating lines 314 refers to the distance between an intersection point C between an end edge of a heating line 314 in the width direction and the first bus bar 312, and an intersection point D between an end edge of an opposing heating line 314 in the width direction and the first bus bar 312, as shown in FIG. 6. In contrast, if the heating lines 314 have a wave shape, two adjacent portions of a heating line (hereinafter, "first heating line 314X") that bulge toward the side opposite to an adjacent heating line (hereinafter, "second heating line 314Y") are selected, and a line M that connects apexes E and F of these bulging portions is defined, as shown in FIG. 7. Also, an apex G of a bulging portion of the second heating line 314Y is selected that is located between the apexes E and F and is closest to the first heating line 314X. The distance L between the line M and the apex G (the length of a line passing through a normal of the line M) is regarded as being the space between two adjacent heating lines.

Next, the material of the heat-generating layer 31 will be described. The base 311 is a transparent film that supports the bus bars 312 and 313 and the heating lines 314. Although the material of the base 311 is not particularly limited, the base 311 can be formed with polyethylene terephthalate, polyethylene, polymethyl metacrylate, polyvinyl chloride, polyester, polyolefin, polycarbonate, polystyrene, polypropylene, nylon, or the like, for example. The bus bars 312 and 313 and the heating lines 314 can be formed with the same material, and can be formed with any of a variety of materials such as copper (or plated copper), tungsten, and silver.

Next, a method of forming the bus bars 312 and 313 and the heating lines 314 will be described. The bus bars 312 and 313 and the heating lines 314 can be formed by arranging fine lines (such as wires) that are formed in advance, or the like, on the base 311. In particular, to further thin the line width of the heating lines 314, the heating lines 314 can be formed by patterning them on the base 311. The method thereof is not particularly limited, but various methods such as printing, etching, and transferring can be used in this patterning. At this time, the bus bars 312 and 313 and the heating lines 314 can be formed separately, or can also be formed integrally. Note that "integrally formed" means that the bus bars 312 and 313 and the heating lines 314 are formed seamlessly in the material thereof, and no interface is present therebetween.

The bus bars 312 and 313 are formed on the base 311, and the base 311 in portions that correspond to the bus bars 312 and 313 are peeled off and removed, while leaving the base 311 for the heating lines 314. Thereafter, the heating lines can also be arranged on the base between the bus bars 312 and 313.

In particular, in the case of employing etching, the following process can be applied as an example. First, metal foil is attached to the base 311 via a primer layer by means of dry lamination. Copper can be used as the metal foil, for example. Then, a chemical etching process using photolithography is performed on the metal foil, and thus, the bus bars 312 and 313 and the plurality of heating lines 314 can be integrally patterned on the base 311. In particular, in the case of reducing the line width of the heating lines 314 (e.g.

to 15 μm or smaller), it is preferable to use thin metal foil. A process may be employed in which a thin metal layer (e.g. of 5 μm or smaller) is formed on the base 311 by means of evaporation, spattering, or the like, and thereafter, patterning is carried out using photolithography.

1-2-2. Adhesion Layer

The adhesion layers 32 and 33 are sheet-shaped members for sandwiching the heat-generating layer 31 and adhering the heat-generating layer 31 to the glass plates 1 and 2. The adhesion layers 32 and 33 are formed to have the same size as the glass plates 1 and 2, and cutout portions that have the same shape as that of the cutout portions 21 and 22 of the inner glass plate 2 are formed at positions on the adhesion layers 32 and 33 corresponding to the cutout portions 21 and 22, respectively. The adhesion layers 32 and 33 can be formed with any of a variety of materials, and can be formed with, for example, polyvinyl butyral resin (PVB), ethylene vinyl acetate (EVA), ionomer, or the like. In particular, polyvinyl butyral resin is favorable in terms of excellent adhesiveness to the glass plates and penetration resistance. Note that a surfactant layer can also be provided between each adhesion layer and the heat-generating layer. This surfactant can improve the surfaces of both layers and increase adhesiveness.

These materials soften at a high temperature (e.g. 70 to 150° C.), such as during later-described autoclave, and deform to follow the shape of the heating lines 314 and the bus bars 312 and 313. Accordingly, particularly the second adhesion layer 33 deforms along the shape of the heating lines 314 and the bus bars 312 and 313, so that the heating lines 314 and the bus bars 312 and 313 are embedded in the second adhesion layer 33. As a result, generation of a gap therebetween can be prevented. Note that the "adhesion layer" in the present invention refers collectively to the first and second adhesion layers 32 and 33 according to this embodiment, and the mode in which the heat-generating layer 31 is arranged between the first and second adhesion layers 32 and 33 corresponds to the heat-generating layer being arranged inward of the adhesion layer in the present invention.

From this viewpoint, it is preferable that the adhesion layers 32 and 33 are formed with a material whose Vicat softening temperature is about 50 to 100° C., for example, so as to deform to follow the shape of the bus bars 312 and 313 and the heating lines 314. The Vicat softening temperature can be measured in accordance with JIS K7206. For example, the Vicat softening temperature of PVB mentioned above is 80° C., and the softening temperature of ionomer is 50° C. Also, it is preferable that the thickness of the adhesion layers 32 and 33 (particularly, the thickness of the second adhesion layer 33) is larger than the thickness of the bus bars 312 and 313 and the heating lines 314 so that the bus bars 312 and 313 and the heating lines 314 are embedded. For example, the thickness of the adhesion layers 32 and 33 can be 0.5 mm or larger.

1-2-3. Thickness of Intermediate Film

The total thickness of the intermediate film 3 is not particularly defined, but is preferably 0.3 to 6.0 mm, more preferably 0.5 to 4.0 mm, and particularly preferably 0.6 to 2.0 mm. The thickness of the base 311 of the heat-generating layer 311 is preferably 0.01 to 2.0 mm, and more preferably 0.03 to 0.6 mm. Meanwhile, it is preferable that the thickness of the adhesion layers 32 and 33 is preferably larger than the thickness of the heat-generating layer 31. Specifically, the thickness of the adhesion layers 32 and 33 is preferably 0.1 to 2.0 mm, and more preferably 0.1 to 1.0 mm. Note that, to closely adhere the second adhesion layer 33 to the base 311, it is preferably that the thickness of the bus bars 312 and 313 and the heating lines 314 that are sandwiched therebetween is 3 to 20 μm.

The thickness of the heat-generating layer 31 and the adhesion layers 32 and 33 can be measured as follows, for example. Initially, a cross-section of the laminated glass is displayed at a magnification ratio of 175 by a microscope (e.g. the VH-5500 manufactured by Keyence Corporation). Then, the thickness of the heat-generating layer 31 and the adhesion layers 32 and 33 is specified by a visual check, and the visually-specified thickness is measured. At this time, to eliminate variation due to the visual check, the measurement is performed five times, and the average value of measurement values obtained through this measurement are used as the thickness of the heat-generating layer 31 and the adhesion layers 32 and 33.

The thickness of the heat-generating layer 31 and the adhesion layers 32 and 33 of the intermediate film 3 does not need to be uniform over the entire surface. For example, these layers can be formed into a wedge shape for laminated glass to be used in a head-up display. In this case, the thickness of the heat-generating layer 31 and the adhesion layers 32 and 33 of the intermediate film 3 is measured at a portion with the smallest thickness, i.e. a lowermost side portion of the laminated glass. If the intermediate film 3 has a wedge shape, the outer glass plate 1 and the inner glass plate 2 are not arranged parallel to each other, but glass plates in such an arrangement is also included in the glass plate according to the present invention. That is to say, the present invention includes an arrangement of the outer glass plate 1 and the inner glass plate 2 in the case of using an intermediate film 3 that includes the heat-generating layer and the adhesion layers 32 and 33 whose thickness increases at a rate of change of 3 mm per meter or less, for example.

1-3. Connecting Material

Next, the connecting materials will be described. The connecting members 41 and 42 are for connecting the bus bars 312 and 313, respectively, to connection terminals (anode terminal or cathode terminal: not shown in the diagram), and are formed into a sheet shape with a conductive material. In the following description, the connecting member connected to the first bus bar 312 will be referred to as a first connecting member 41, and the connecting member connected to the second bus bar 313 will be referred to as a second connecting member 42. Since the connecting members 41 and 42 have the same configuration, the following will mainly describe the first connecting member 41.

The first connecting member 41 is formed into a rectangular shape, and is sandwiched between the first bus bar 312 and the second adhesion layer 33. The first connecting member 41 is then fixed to the first bus bar 312 by a fixing material 5, such as solder. It is preferable that, for example, solder with a low melting point of 150° C. or lower is used as the fixing material 5 so that the first connecting material 41 can be fixed by means of autoclave at the same time as later-described assembly of the windshield. The first connecting member 41 extends from the first bus bar 312 to an upper end edge of the outer glass plate 1, and is exposed from the first cutout portion 21 that is formed in the inner glass plate 2. A connection terminal, to which a cable extending to a power source is connected, is connected to this exposed portion via a fixing material such as solder. Thus, connection terminals are fixed to the portions of the connecting members 41 and 42 that are exposed from the cutout portions 21 and 22 of the inner glass plate 2, whereas the connecting members 41 and 42 do not protrude from end portions of the glass plates 1 and 2. Note that the connecting members 41 and 42 are made of a thin material, and can thus be folded and then fixed, at their end portions, to the bus bar 312 via the fixing material 5, as shown in FIG. 2.

2. Method of Manufacturing Windshield

Next, a method of manufacturing the windshield will be described. First, a manufacturing line for the glass plates will be described.

Figure 8:
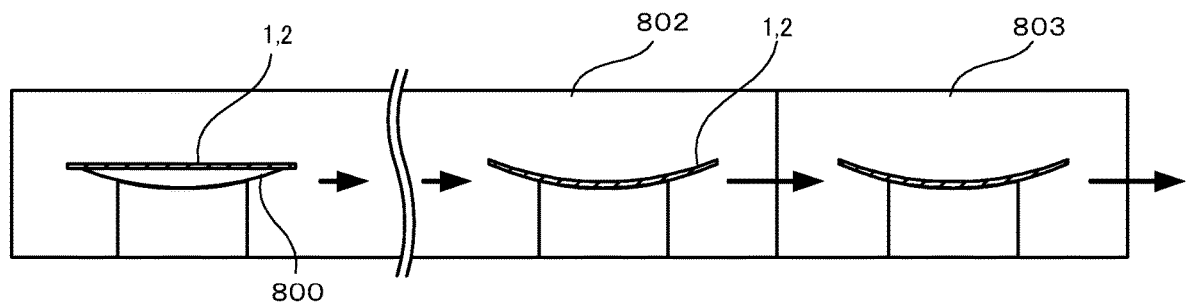
FIG. 8 is a side view of a furnace through which a molding tool passes.
Figure 9:
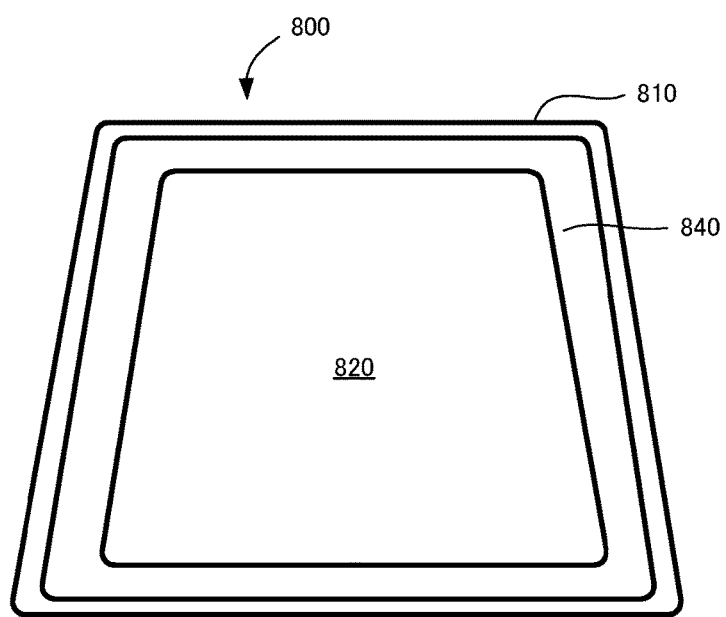
FIG. 9 is a plan view of the molding tool.

Here, a more detailed description will be giving of a molding tool, with reference to FIGS. 8 and 9. FIG. 8 is a side view of a furnace through which the molding tool passes, and FIG. 9 is a plan view of the molding tool. As shown in FIG. 9, a molding tool 800 includes a frame-shaped molding body 810, whose shape substantially coincides with the outer shape of the glass plates 1 and 2. Since the molding body 810 is formed into a frame shape, an internal space 820, which penetrates in the up-down direction, is formed therewithin. Peripheral portions of the glass plates 1 and 2, which have a flat plate shape, are placed on the upper face of the molding body 810. For this reason, heat is applied to the glass plates 1 and 2 from a heater (not shown in the diagram), which is arranged on the lower side, via the internal space 820. Thus, the glass plates 1 and 2 are softened by the applied heat, and are bent downward due to their own weight. In some cases, a shielding plate 840 for heat shielding is arranged on the inner peripheral edge of the molding body 810, so that the heat received by the glass plates 1 and 2 can be adjusted thereby. The heater can be provided not only below but also above the molding tool 800.

Then, the outer glass plate 1 and the inner glass plate 2, which have a flat plate shape, are laminated, and pass through a heating furnace 802 while being supported by the molding tool 800, as shown in FIG. 8. Upon being heated to a temperature close to the softening temperature within the heating furnace 802, the inner side of the glass plates 1 and 2 bend downward relative to the peripheral portion, due to their own weight, and are formed into a curved face. Subsequently, the glass plates 1 and 2 are brought into an annealing furnace 803 from the heating furnace 802, and an annealing process is performed. Thereafter, the glass plates 1 and 2 are brought out of the annealing furnace 803 and are cooled.

After the outer glass plate 11 and the inner glass plate 12 have thus been formed, subsequently, the intermediate film 3 is sandwiched between the outer glass plate 11 and the inner glass plate 12. Specifically, first, the outer glass plate 1, the first adhesion layer 32, the heat-generating layer 31, the second adhesion layer 33, and the inner glass plate 2 are laminated in this order. At this time, the face of the heat-generating layer 31 in which the first bus bar 312 and so on are formed is oriented toward the second adhesion layer 33 side. Upper and lower end portions of the heat-generating layer 31 are arranged inward of the cutout portions 21 and 22 of the inner glass plate 2. Furthermore, the cutout portions of the first and second adhesion layers 32 and 33 are matched with the cutout portions 21 and 22 of the inner glass plate 2. Thus, the outer glass plate 1 is exposed from the cutout portions 21 and 22 of the inner glass plate 2. Subsequently, the connecting members 41 and 42 are inserted between the heat-generating layer 31 and the second adhesion layer 33 from the cutout portions 21 and 22, respectively. At this time, solder with a low melting point, which serves as the fixing material 5, is applied to the connecting members 41 and 42, so that this solder is arranged on the bus bars 312 and 313.

A laminated body in which the glass plates 1 and 2, the intermediate film 3, and the connecting members 41 and 42 are thus laminated is put into a rubber bag, and is subjected to preliminary adhesion at about 70 to 110° C. while being subjected to a reduced-pressure suction. Any other method can alternatively be used in preliminary adhesion, and the following method can also be employed. For example, the aforementioned laminated body is heated to to 65° C. by an oven. Next, this laminated body is pressed by a roll at 0.45 to 0.55 Mpa. Subsequently, this laminated body is heated again to 80 to 105° C. by the oven, and is then pressed again at 0.45 to 0.55 Mpa by the roller. Preliminary adhesion is thus completed.

Next, main adhesion is performed. The laminated body after having undergone preliminary adhesion is subjected to main adhesion with 8 to 15 atm at 100 to 150° C., for example, by means of autoclave. Specifically, for example, main adhesion can be performed under the condition of 14 atm and 135° C. The adhesion layers 32 and 33 are adhered to the glass plates 1 and 2, respectively, with the heat-generating layer 31 therebetween, through the above-described preliminary adhesion and main adhesion. Furthermore, the solder on the connecting members 41 and 42 melts, and the connecting members 41 and 42 are fixed to the bus bars 312 and 313, respectively. The laminated glass according to this embodiment is thus manufactured.

3. Method of Using Windshield

The windshield that is configured as described above is attached to a vehicle body, and connection terminals are fixed to the connecting members 41 and 42. Thereafter, upon electric power being supplied to the connection terminals, a current is applied to the heating lines 314 via the connecting members 41 and 42 and the bus bars 312 and 313, and heat is generated. The windshield can be defogged with the generated heat.

4. Features

As described above, the following effects can be achieved according to the present embodiment.

(1) Since the glass plates 1 and 2 are formed into a trapezoidal shape, the plurality of heating lines 314 are formed so that the spaces therebetween increase downward from above, between the bus bars 312 and 313, in accordance with the shape of the glass plates 1 and 2. For this reason, the area to be heated by the heating lines 314 is larger in lower portions of the glass plates 1 and 2 than in upper portions thereof. In this embodiment, the width between each heating line 314 is formed to decrease downward from above. With this configuration, the amount of heat generation by each heating line 314 expands downward, and the heatable area thus expands downward. Accordingly, even if the space between adjacent heating lines are larger in the lower portions of the glass plates 1 and 2, the glass plates 1 and 2 can be defogged reliably.

Particularly, depending on the vehicle type, wind from a defroster does not reach both end portions of the windshield. However, in this embodiment, both end portions of the windshield can be reliably heated and defogged. Furthermore, when snow is cleared with a wiper, the snow accumulates in both end portions of the windshield. Even if snow accumulates in such portions, the windshield can be reliably deiced using the heating lines.

(2) Since the bus bars 312 and 313 and the heating lines 314 are made of the same material, the bus bars 312 and 313 and the heating lines 314 have the same coefficient of linear expansion. For this reason, there is the following advantage. If the bus bars 312 and 313 and the heating lines 314 are forming with different materials, the bus bars 312 and 313 and the heating lines 314 have different coefficients of linear expansion. Then, if, for example, these members are separately produced and fixed, problems may occur, e.g. the heating lines may come off of the bus bars, which may further causes the two glass plates that constitute the laminated glass to be raised relative to each other, due to a harsh change in the environment, such as that during a heat cycle test. However, such problems can be prevented by forming the bus bars 312 and 313 and the heating lines 314 with the same material as in this embodiment.

(3) Since the bus bars 312 and 313 and the heating lines 314 are formed integrally, a failure in the contact therebetween and a failure in heat generation can be prevented. A failure in heat generation will be described below in detail. Ordinarily, in the case of heating a glass plate for preventing fogging, current value control is required so that the upper limit value of the heating temperature is 70 to 80° C., for example, in order to prevent glass cracking. In this regard, if heat is locally generated due to the aforementioned contact resistance, current value control is needed with the temperature in the portion where heat is locally generated as the upper limit value of the heating temperature. As a result, the heating lines cannot be entirely controlled to sufficiently generate heat. However, the above-described configuration can prevent local heat generation, and it is therefore also possible to control the entire heating lines to sufficiently generate heat.

(4) The heat-generating layer 31 in which the bus bars 312 and 313 and the heat-generating layer 314 are arranged is sandwiched by the adhesion layers 32 and 33, and is arranged between the glass plates 1 and 2. As a result, the heat-generating layer 31 can be reliably fixed to the glass plates 1 and 2. Also, by covering the bus bars 312 and 313 and the heating lines 314 with the second adhesion layer 33, these members can be prevented from coming into contact with the glass plates. As a result, the glass plates can be prevented, in advance, from cracking.

(5) In the above embodiment, the bus bars 312 and 313 are connected to external terminals using two connecting members 41 and 42. However, for example, it is also conceivable that wide bus bars are prepared, unnecessary portions of these bus bars are cut off, and thereafter the bus bars are partially exposed from the cutout portions 21 and 22, thereby substituting the connecting members. However, it is also conceivable that this configuration will cause heat to be locally generated at corners of the cut bus bars. In this regard, in this embodiment, separate connecting members 41 and 42 are fixed to the respective bus bars 312 and 313, and it is therefore possible to prevent such local heat generation.

(6) Since the adhesion layers 32 and 33 are made of a deformable material, the adhesion layers 32 and 33 come into intimate contact with the heating lines 314 or the bus bars 312 and 313, and it is thus possible to prevent formation of a gap therebetween. For this reason, for example, bubbles can be prevented from remaining during the aforementioned autoclave.

From the viewpoint of thus preventing bubbles from remaining, it is preferable that the faces of the heating lines 314 and the bus bars 312 and 313 that come into contact with the second adhesion layer 33 are not uneven and are flat. In this case, for example, the thickness (thickness the direction in which the adhesion layers 32 and 33 are laminated) of the heating lines 314 may change in the length direction, as long as the faces thereof that come into contact with the second adhesion layer 33 have no steps, steep protrusions or recesses. Accordingly, it is more preferable that the thickness of the heating lines 314 and the bus bars 312 and 313 are uniform as a whole. The same also applies to the following modifications.

5. Modifications

Although one embodiment of the present invention has been described so far, the present invention is not limited to the above embodiment, and can be modified in various manners without departing from the gist thereof. Also, the following modifications, as well as the above embodiment, can be combined as appropriate.

5-1

In the above embodiment, the intermediate film 3 is constituted by a total of three layers, which are the heat-generating layer 31 and the pair of adhesion layers 32 and 33. However, this may not necessarily be the case. That is to say, the intermediate film 3 need only include at least the bus bars 312 and 313 and the heating line 314. Accordingly, for example, it is possible to include only one adhesion layer, or the heat-generating layer 31 can be sandwiched between the glass plates 1 and 2 using an adhesive or the like. Also, the base 311 may not be provided in the heat-generating layer 31.

In the case of not providing the base 311, the heat-generating layer 31 includes at least the heating lines 314 (or the heating lines 314 and the bus bars 312 and 313). In this case, however, the heat-generating layer 31 is arranged between the adhesion layers 32 and 33, and when being exposed to high temperature, such as during autoclave, the adhesion layers 32 and 33 are integrated and cannot readily be distinguished (or cannot be distinguished) from each other. The adhesion layers 32 and 33 are not limited to those formed with the same material, and for example, a plasticizer or the like can also be blended with the material of one of the adhesion layers 32 and 33. The composition and the blending amount of additives or the like can also be changed.

Figure 10A:
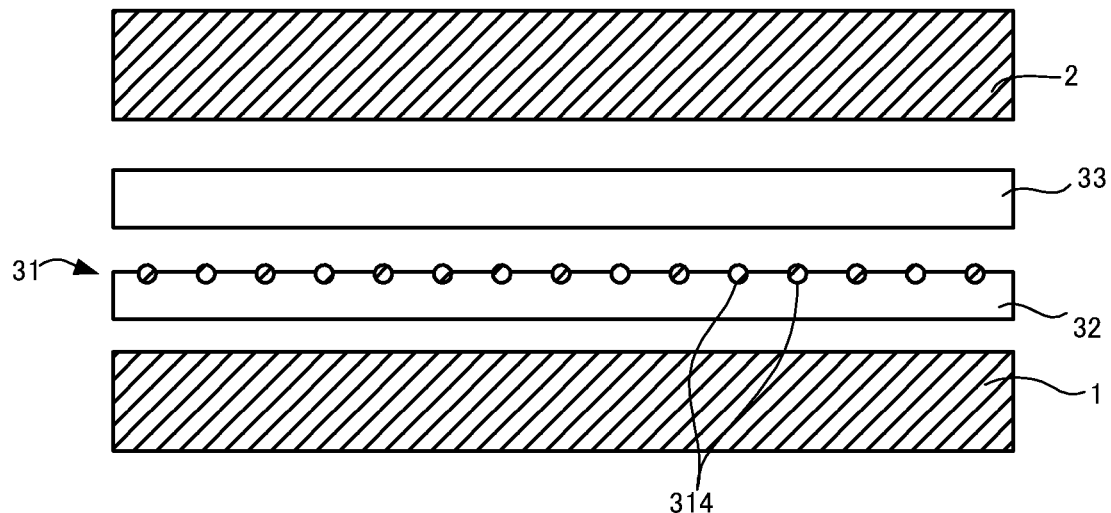
FIG. 10A is an exploded cross-sectional view of a windshield, illustrating another example of an intermediate film.
Figure 10B:
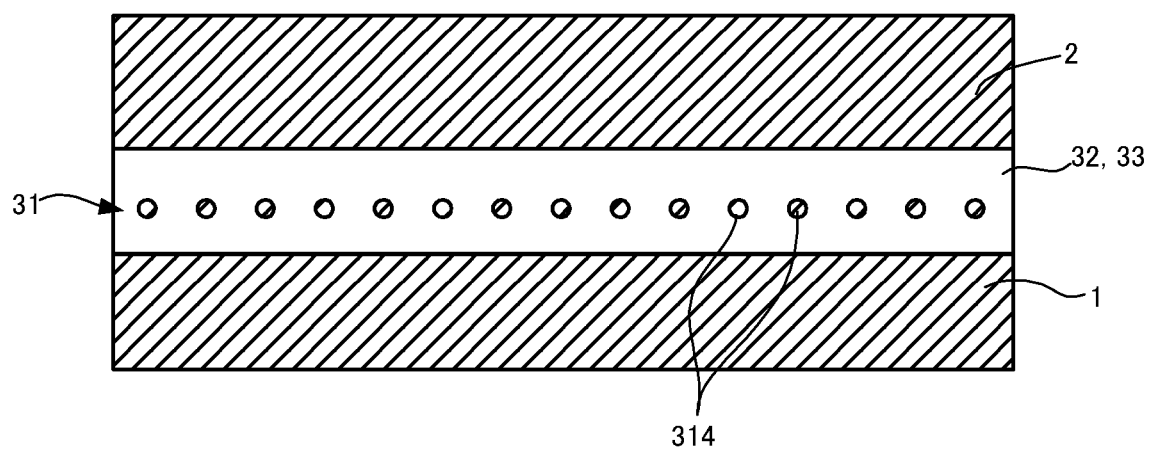
FIG. 10B is a cross-sectional view of a windshield, illustrating another example of the intermediate film.

Thus, in the case of not providing the base 311, the heating lines 314 and so on are formed by means of etching, or the like, on the first adhesion layer 32, and this first adhesion layer 32 is then laminated with the second adhesion layer 33 so that the heating lines 314 are sandwiched between the adhesion layers 32 and 33, as shown in FIG. 10A. Upon the aforementioned autoclave being thereafter performed, the adhesion layers 32 and 33 are integrated, and the heat-generating layer 31 that includes the heating lines 314 and the bus bars 312 and 313 is arranged inward of the adhesion layers 32 and 33, as shown in FIG. 10B.

Figure 11A:
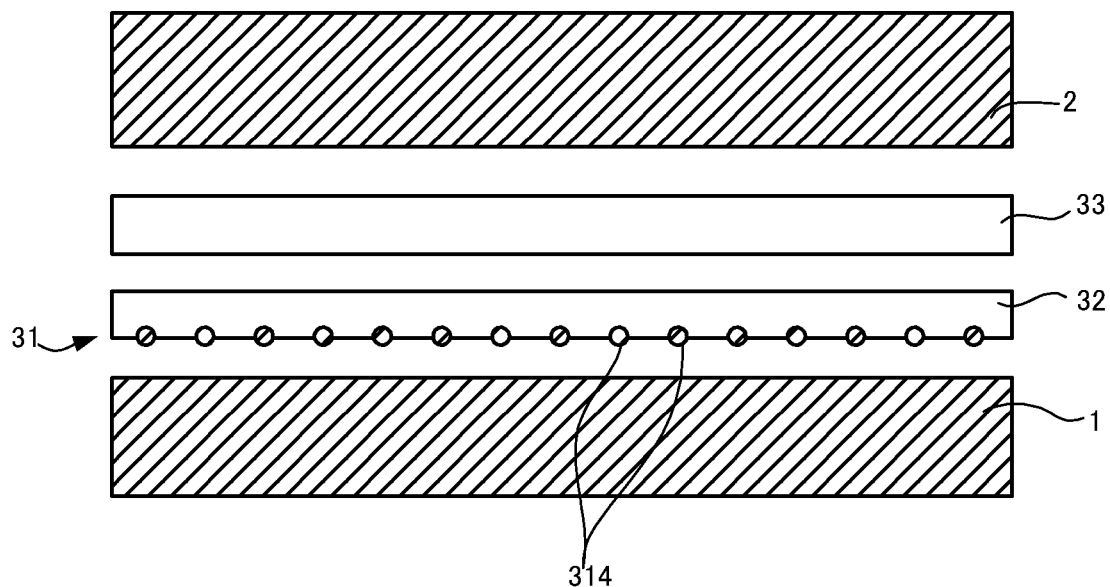
FIG. 11A is an exploded cross-sectional view of a windshield, illustrating another example of the intermediate film.
Figure 11B:
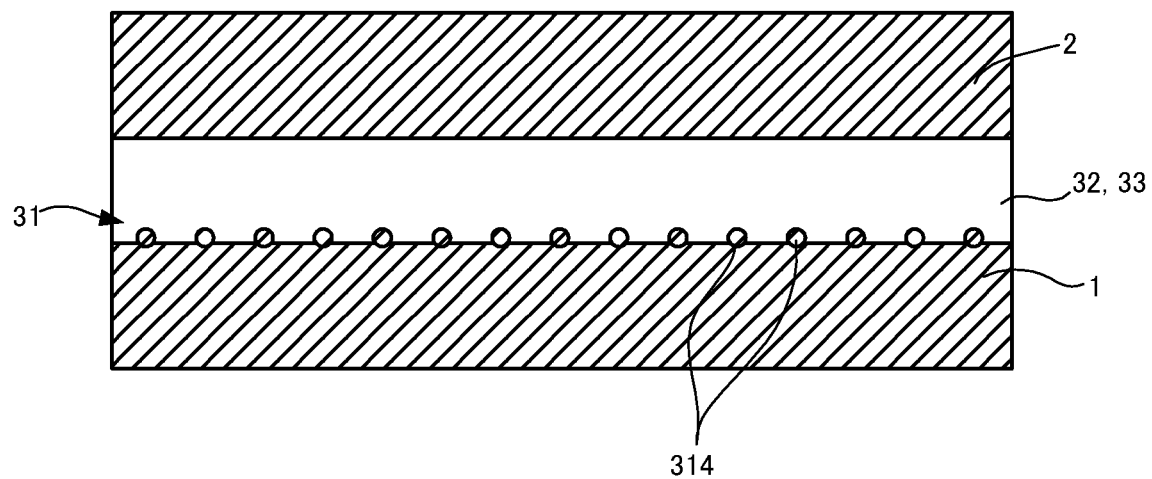
FIG. 11B is a cross-sectional view of a windshield, illustrating another example of the intermediate film.

Alternatively, as shown in FIG. 11A, a configuration can also be employed in which the first adhesion layer 32, in which the heating lines 314 are arranged, is arranged so that the heating lines 314 face the outer glass plate 1, and the second adhesion layer 33 is arranged so as to face the inner glass plate 2. That is to say, the two adhesion layers 32 and 33 can be laminated with each other, and can then be arranged between the glass plates 1 and 2. Upon autoclave being thereafter performed, the adhesion layers 32 and 33 are integrated, and the heating lines 314 come into direct contact with the outer glass plate 1 as shown in FIG. 11B. Thus, the glass plates can be heated at a higher temperature. However, formation of a gap is more reliably prevented when the bus bars 312 and 313 and the heating lines 314 come into contact with more flexible adhesion layer 32 and 33. For this reason, from the viewpoint of the generation of bubbles, it is preferable that the bus bars 312 and 313 and the heating lines 314 are arranged inward of the adhesion layers 32 and 33.

5-2

The heat-generating layer 31 can be formed into any of a variety of shapes. For example, a sheet-shaped heat-generating layer 31 in which the bus bars 312 and 313 and the heating lines 314 are formed can be prepared on the base 311, in advance, and this heat-generating layer 31 can be cut off as appropriate into an appropriate shape and arranged between the glass plates 1 and 2. Accordingly, for example, if the end edges of the glass plates 1 and 2 are curved, end edges of the base 311 may also be curved in accordance therewith. The shape of the heat-generating layer 31 does not need to be completely matched with the shape of the glass plates 1 and 2. Since the heat-generating layer 31 can be arranged only in a portion where the defogging effect is to be achieved, the heat-generating layer 31 can be formed into any of various shapes, e.g. a shape with a size smaller than that of the glass plates 1 and 2. Note that the glass plates 1 and 2 can also be formed into any of various shapes other than a completely rectangular shape.

In the above embodiment, the bus bars 312 and 313 and the heating lines 314 are arranged on the base 311. However, at least the heating lines 314 need only be arranged on the base 311. Accordingly, for example, the bus bars 312 and 313 can also be arranged between the adhesion layers 32 and 33. Also, as long as the distance between adjacent heating lines 314 expands downward, the length of the bus bars 312 and 313 is not particularly limited. Accordingly, the bus bars 312 and 313 may also have the same length.

5-3

Figure 12A:
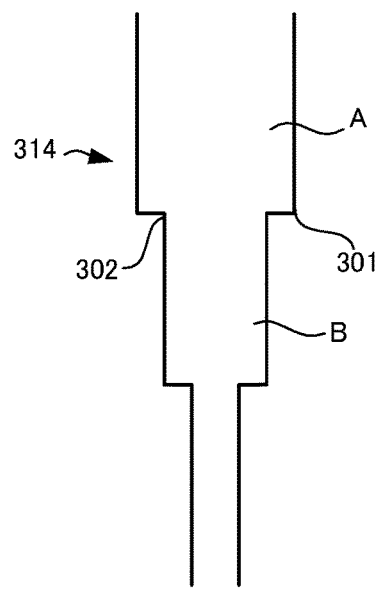
FIG. 12A is an enlarged view illustrating another example of a heating line.
Figure 12B:
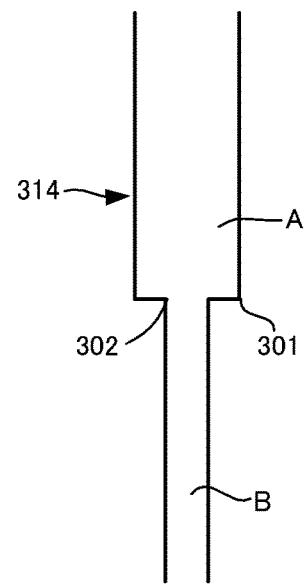
FIG. 12B is an enlarged view illustrating another example of the heating line.
Figure 12C:
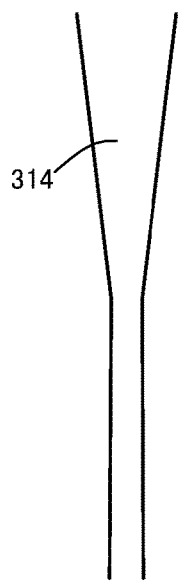
FIG. 12C is an enlarged view illustrating another example of the heating line.

The method of setting the line width of the heating lines 314 is not particularly limited. Although, in the above embodiment, the width of the heating lines 314 is gradually reduced downward, the width of the heating lines 314 can be reduced stepwise as shown in FIG. 12A, or the upper width may be larger and the lower width may be smaller as shown in FIG. 12B, or the width of a portion of each heating line 314 may be gradually narrowed downward, and the width of the other portion may be fixed, as shown in FIG. 12C. The same also applies to the distance between adjacent heating lines 314. The distance may be gradually increased downward, or may be increased stepwise.

In the case of the modes shown in FIGS. 12A and 12B, corners of a connecting region between a wide portion A and a narrow portion B are likely to be heat spots. That is to say, abnormal heating may occur. Specifically, of the aforementioned connecting region, corners 301, which are formed at both side edges of the wide portion A, and a corner 302, which is formed by both side edges of the narrow portion B and the wide portion A, are likely to be heat spots. Accordingly, to prevent heat spots, the curvature radius of these corners 301 and 302 is preferably 1 μm or larger, and more preferably 5 μm or larger.

5-4

Figure 13:
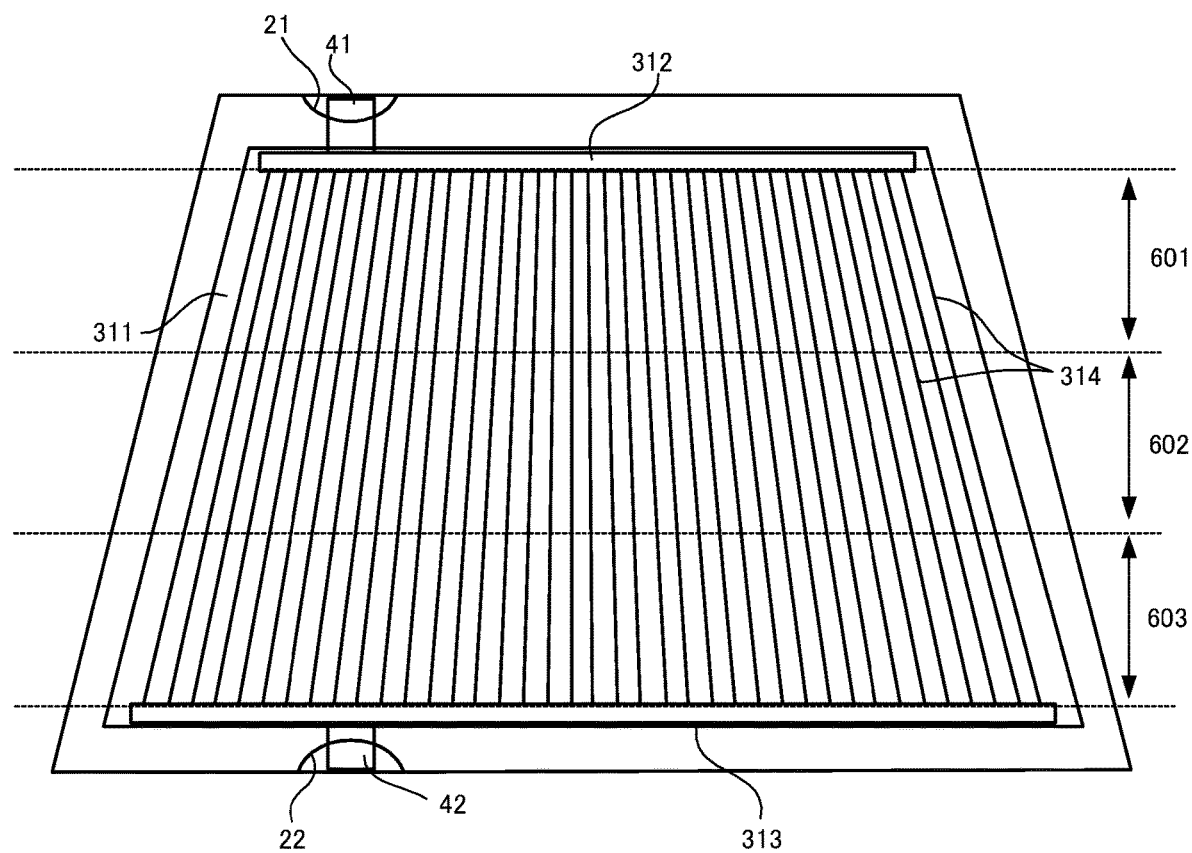
FIG. 13 is a plan view illustrating differences in the amount of heat generation within a windshield.

As mentioned above, by changing the width or the like of the plurality of heating lines 314, a plurality of areas (three areas 601, 602, and 603 in FIG. 13) with different amounts of heat generation can be formed more clearly in the up-down direction (first direction) of the laminated glass, as shown in FIG. 13, for example. To form these areas, each heating line 314 is configured to have portions with different amounts of heat generation in the up-down direction. Specifically, each heating line is formed by combining a plurality of portions with different widths (or cross-sectional areas). The cross-sectional area of the heating lines 314 affects the amount of heat generation in practice. However, to change the cross-sectional area, it is easier to change the width of the heating lines 314 than to change the thickness thereof, and thus, there are cases where the width is changed while hardly changing the thickness (particularly in the case of etching). Accordingly, since the width and the cross-sectional area technically have substantially the same meaning, these terms will be used without distinction in some cases below.

Figure 14A:
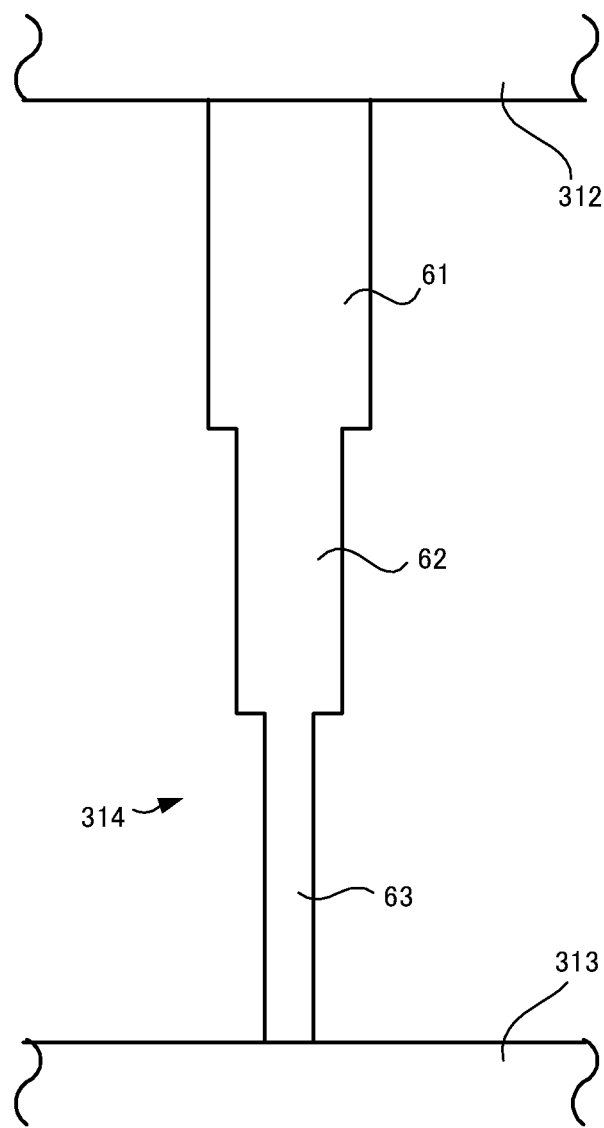
FIG. 14A is a plan view of a heating line used in the windshield in FIG. 13.

As shown in FIG. 14A, in this example, each heating line is formed by combining three portions arranged in the up-down direction, namely a first portion 61, a second portion 62, and a third portion 63, which are arranged in this order downward from above. The width of the first portion 61, the second portion 62, and the third portion 63 decreases further in this order. Since a constant current flows through one heating line 314, the resistance is larger and the amount of heat generation is larger in a portion with a smaller cross-sectional area (width) according to Expression (1) below, $$W=IE=I^2R=I^2\rho(L/A) \quad (1)$$

Here, W: electric power, E: voltage, I: current, R: resistance, L: length, A: cross-sectional area, and ρ: electric resistivity Accordingly, the amount of heat generation decreases in the order of the third portion 63, the second portion 62, and the first portion 61. If such heating lines 314 are arranged substantially parallel to each other in the left-right direction between the bus bars 312 and 313, as shown in FIG. 13, the amount of heat generation can be differentiated between three regions corresponding to the first portion, the second portion, and the third portion, namely a first region 601, a second region 602, and a third region 603. In this example, the amount of heat generation is lowest in the first region 601, and is highest in the third region 603.

Figure 14B:
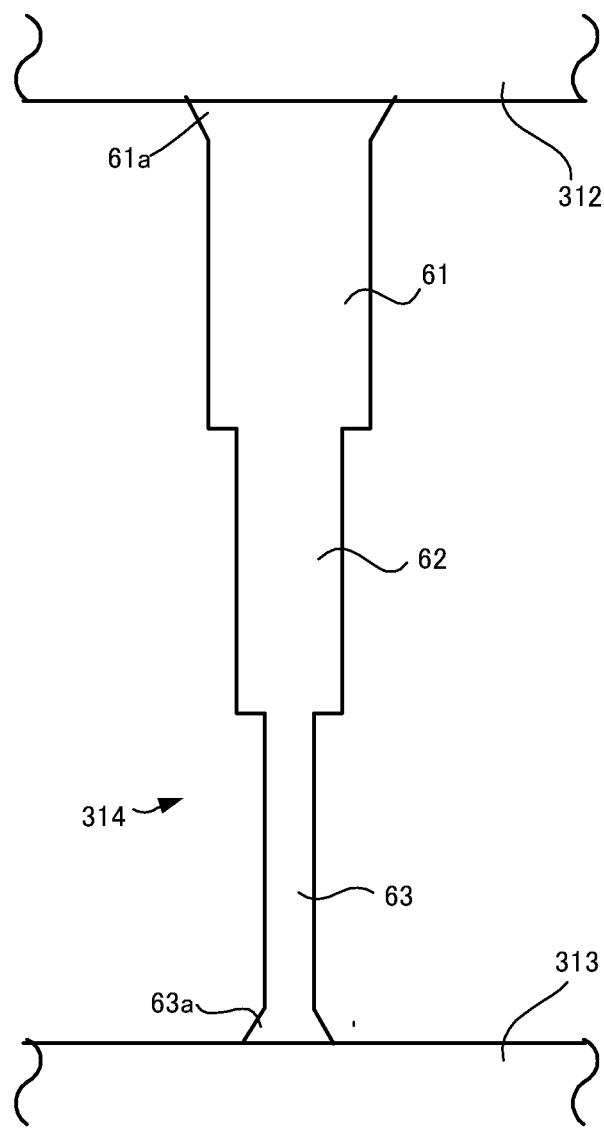
FIG. 14B is a plan view of another heating line used in the windshield in FIG. 13.

As shown in FIG. 14B, the width portions 61a and 63a of each heating line 314 that are connected to the bus bars 312 and 313, respectively, can be made larger than the width of the other portions. This configuration can prevent a break at the connecting portions between each heating line 314 and the bus bars 312 and 313.

Figure 15:
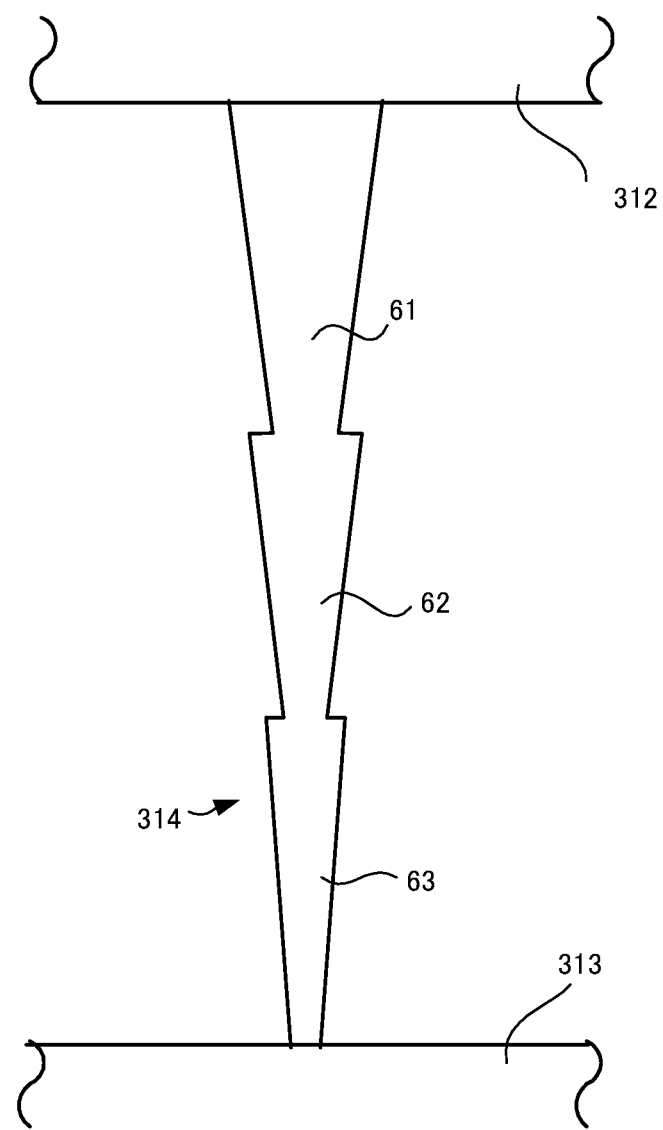
FIG. 15 is a plan view of another heating line used in the windshield in FIG. 13.

The respective widths of the portions 61, 62, and 63 of each heating line can be constant as shown in FIG. 14A, or may also be changed as shown in FIG. 15. The example in FIG. 15 is applied when the amount of heat generation is also changed within each of the regions. Particularly, it is preferable to apply this shape in the case where the space between adjacent heating lines 314 varies in the up-down direction as mentioned above. That is to say, the example in FIG. 15 corresponds to a mode in which the space between adjacent heating lines 314 expands downward. Thus, the width of each heating line 314 is reduced downward, so that the amount of heat generation increases as the space between adjacent heating lines 314 increases.

In the case of changing the amount of heat generation, the amount of heat generation can be changed between a region through which a wiper passes and a region through which the wiper does not pass. For example, the third region 603 in FIG. 13 is a region through which the wiper passes, and the first and second regions 601 and 602 are regions through which the wiper does not pass. Accordingly, in this case, the amount of heat generation in the third region 603, which can be deiced using the wiper, may be reduced, and the amount of heat generation in the other regions 601 and 602 can be increased.

As described above, limited electric power can be effectively allocated by differentiating the amount of heat generation between the regions of the laminated glass. That is to say, the amount of heat generation can be increased in a region where fogging is particularly likely to occur, or a region that needs to be quickly defogged, and the amount of heat generation can be reduced in other regions.

5-5

Figure 16:
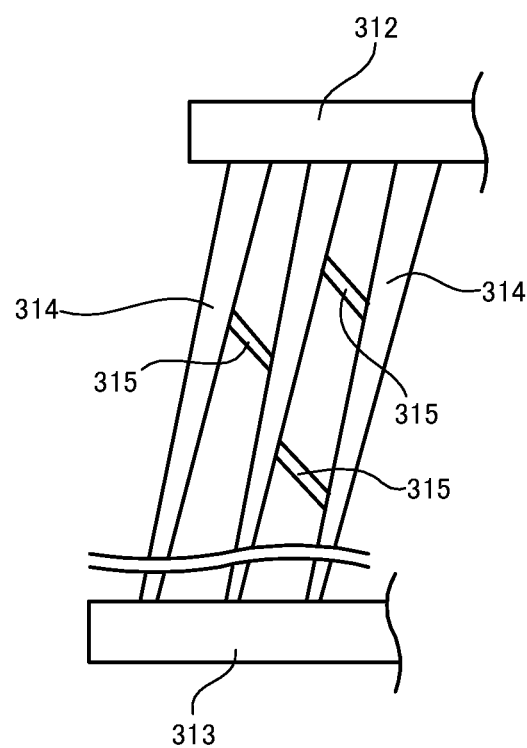
FIG. 16 is an enlarged view illustrating another example of the heating lines.

Adjacent heating lines 314 can also be connected using at least one bypass line. Thus, for example, even if one of the heating lines 314 is broken, electric power can be supplied from the adjacent heating line 314. Various modes are available to provide such a bypass line, and for example, a mode shown in FIG. 16 can be employed. That is to say, at least one bypass lines 315 can be provided between adjacent heating lines 314 to connect these heating lines 314. The position and the number of bypass lines are not particularly limited. The shape of the bypass lines 315 is not particularly limited either. The bypass lines 315 can be arranged so as to extend obliquely as shown in FIG. 16, or can be formed into any of a variety of shapes, such as a wave shape. Note that the bypass lines 315 may be formed with the same metallic material as that of the heating lines 314, and may be integrally formed with the heating lines 314.

5-6

Figure 17:
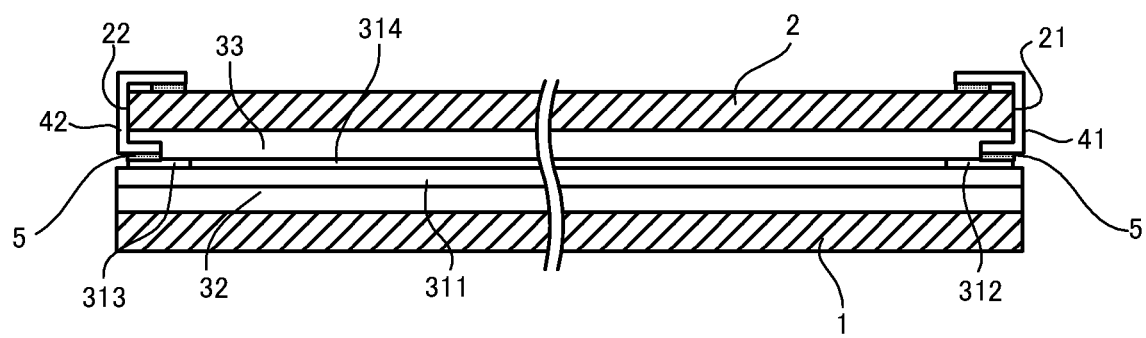
FIG. 17 is a cross-sectional view of laminated glass, illustrating another example of a connecting material.

The mode of the connecting members 41 and 42 and the configuration of the cutout portions 21 and 22 of the inner glass plate 2 are not particularly limited either. For example, as shown in FIG. 17, a configuration can also be employed in which small cutout portions 21 and 22 with substantially the same thickness as that of the connecting members 41 and 42 are formed in the inner glass plate 2, and the connecting members 41 and 42 that extend from the respective bus bars 312 and 313 are folded back at these cutout portions 21 and 22, and are stuck to a surface of the inner glass plate 2. This configuration can prevent the connecting members 41 and 42 from protruding in the face direction from the end portions of the laminated glass.

5-7

The laminated glass according to the present invention can also be applied to windshields that are provided in the vehicle interior, and are equipped with an information acquisition device such as a sensor for measuring the distance to the vehicle driving ahead, an infrared camera, or a light beacon. In the example shown in FIG. 18, a peripheral region 101 is provided that is formed by applying, for example, a ceramic with a deep color, such as black, over peripheral edges of the glass plates 1 and 2 and heating the ceramic, in order to obstruct the field of view from outside. Also, an extension portion 102, which extends downward, is provided at the center of an upper side of the peripheral region 101. This extension portion 102 is also formed with black ceramic, and a window portion (information acquisition region) 103 that does not contain a ceramic is formed in the extension portion 102. This window portion 103 allows the aforementioned information acquisition device to emit and/or receive light from the vehicle interior. Although only one window portion 103 is provided in this example, the number of window portions is set as appropriate, in accordance with the type of information acquisition device, such as a stereo camera. Also, an obstructing region for obstructing the field of view from outside is formed by the aforementioned peripheral region 101 and extension portion 102. This obstructing layer can be formed in any of an outer face (first face) and an inner face (second face) of the inner glass plate 2, and an outer face (first face) and an inner face (second face) of the outer glass plate 1. The obstructing layer can also be formed in two portions, one in the inner face of the inner glass plate 2 and the other one in the inner face of the outer glass plate 1.

In the case where such an information acquisition device is provided, the first bus bar 312 is provided along the upper side of the laminated glass, and the second bus bar 313 is provided along the lower side. The first bus bar 312 is arranged so as to pass through a portion of the peripheral region 101 that corresponds to the upper side, and the extension portion 102. More specifically, the first bus bar 312 passes through both sides and the lower side of the window portion 103 of the extension portion 102. Both sides of the portion of the first bus bar 312 that pass through the extension portion 102 are arranged in the peripheral region 101. Meanwhile, the second bus bar passes through a portion of the peripheral region 101 that corresponds to the lower side. The bus bars 312 and 313 are thus provided along the obstructing region, and cannot accordingly be seen from outside or inside of the vehicle.

If the first bus bar 312 is arranged on both sides and the lower side of the window portion 103, the following effects can be achieved. For example, if the first bus bar 312 passes over the window portion 103 and the heating lines 314 straddle the window portion 314, for example, the head light of an oncoming car scatters, which may cause the information to be sent to the information acquisition device to be incorrect. Accordingly, the information acquisition device can correctly acquire information as a result of arranging the first bus bar 312 as described above. Also, since the first bus bar 312 does not pass through the window portion 103, an electromagnetic field generated from the heating lines 314 can be prevented from generating noise on the information acquisition device. Furthermore, portions of the first bus bar 312 that do not correspond to the window portion are arranged upward of the window portion 103, and thus, the field of view of the driver can be expanded.

The plurality of heating lines 314 extend in the up-down direction so as to connect the first bus bar 312 and the second bus bar 313 to each other, and are arranged substantially parallel to each other with predetermined spaces therebetween. At this time, a plurality of heating lines (hereinafter, "first heating lines 314a", of which there are five in this example) that are arranged below the window portion 103 are shorter than a plurality of heating lines (hereinafter, "first heating lines 314b") that are arranged on both sides of the window portions 103. The line width of the first heating lines 314a is smaller than the line width of the second heating lines 314b. Since the first heating lines 314a are shorter than the second heating lines 314b, the resistance in the first heating lines 314 is smaller. For this reason, the respective line widths of the first and second heating lines 314a and 314b are determined as mentioned above to complement the smaller resistance in the first heating lines 314 and prevent the amount of heat generation from decreasing in the first heating lines 314a. Of the first heating lines 314a, two heating lines 314a arranged on both sides are longer than three heating lines 314a arranged in the center, and can accordingly have a larger line width than that of the three heating lines 314a arranged in the center. In this windshield, the region in which the first heating lines 314a are arranged corresponds to a central region in the present invention, and the region in which the second heating lines 314b are arranged corresponds to a side region in the present invention.

As an example of the length and width of the heating lines, for example, the width of heating lines with lengths of 555 mm, 673 mm, and 790 mm can be 10 μm, 12.1 μm, and 14.2 μm, respectively.

Since the first and second heating lines 314a and 314b are arranged substantially parallel to each other, the line width does not need to be changed downward from above, and the line width thereof is fixed. However, in the case where the space between adjacent heating lines expands downward as in FIG. 1, the line width can be reduced downward as described above.

Figure 18:
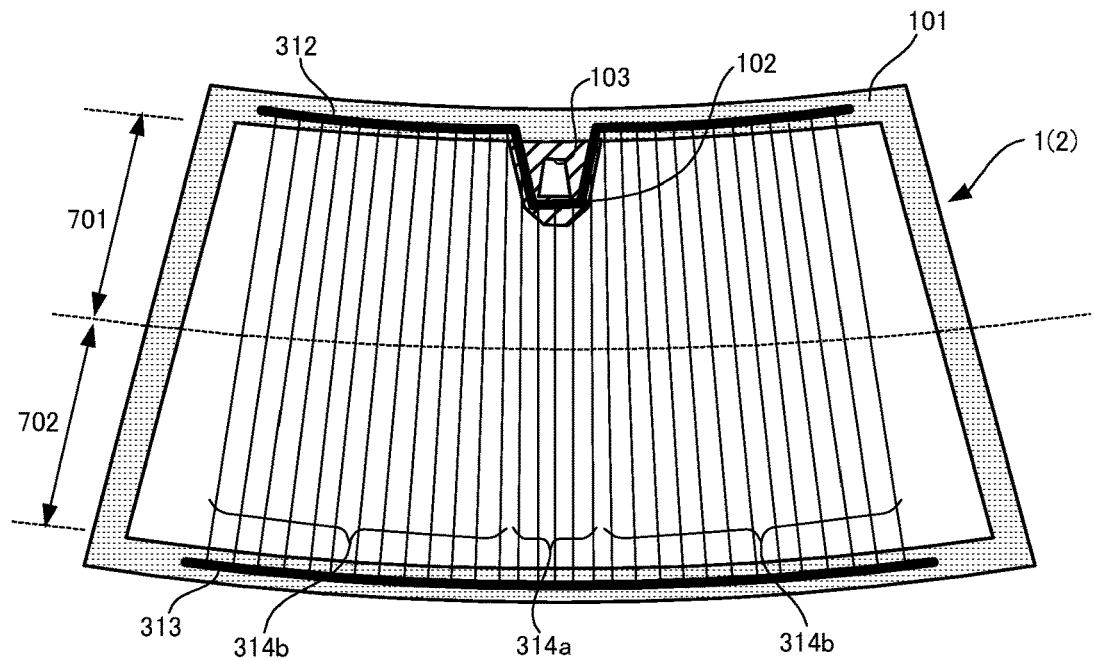
FIG. 18 is a front elevational view illustrating another example of the windshield.

The amount of heat generation can also be changed in the up-down direction in the central region in which the first heating lines 314a are arranged. For example, as shown in FIG. 18, a configuration can also be employed in which the laminated glass is partitioned into two regions in the up-down direction, which are a first region 701 and a second region 702, and the amount of heat generation in the first region 701, which is closer to the window portion 103, can be made larger than that in the second region 702. As a result, the amount of heat generated around the window portion 103 is large, and the window portion 103 can be defogged more effectively. To thus differentiate the amount of heat generation, the width of the heating lines 310 need only be changed in the length direction as mentioned above. That is to say, in the example in FIG. 18, the width of the heating lines 314a in the first region 701 need only be reduced, and the width of the heating lines 314a in the second region 702 need only be increased.

Figure 19:
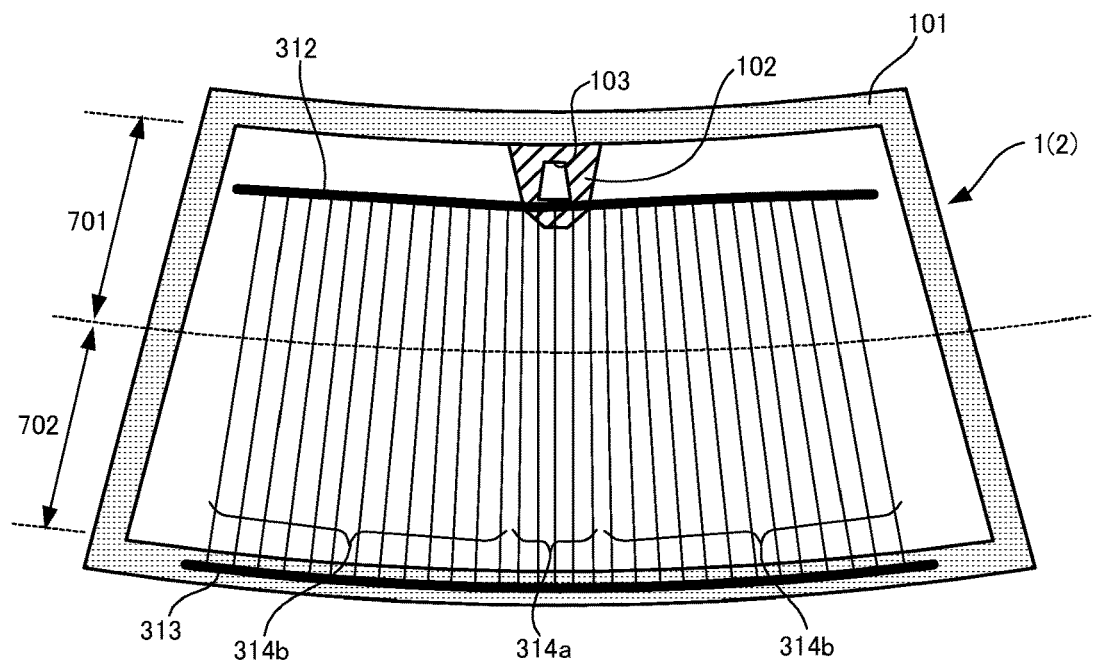
FIG. 19 is a front elevational view illustrating another example of the windshield.

Also, in this example, only a portion of the first bus bar 312 that corresponds to the central region is arranged downward of the window portion 103. However, for example, the entire first bus bar 312 can alternatively be arranged downward of the window portion 103, as shown in FIG. 19.

5-8

Figure 20:
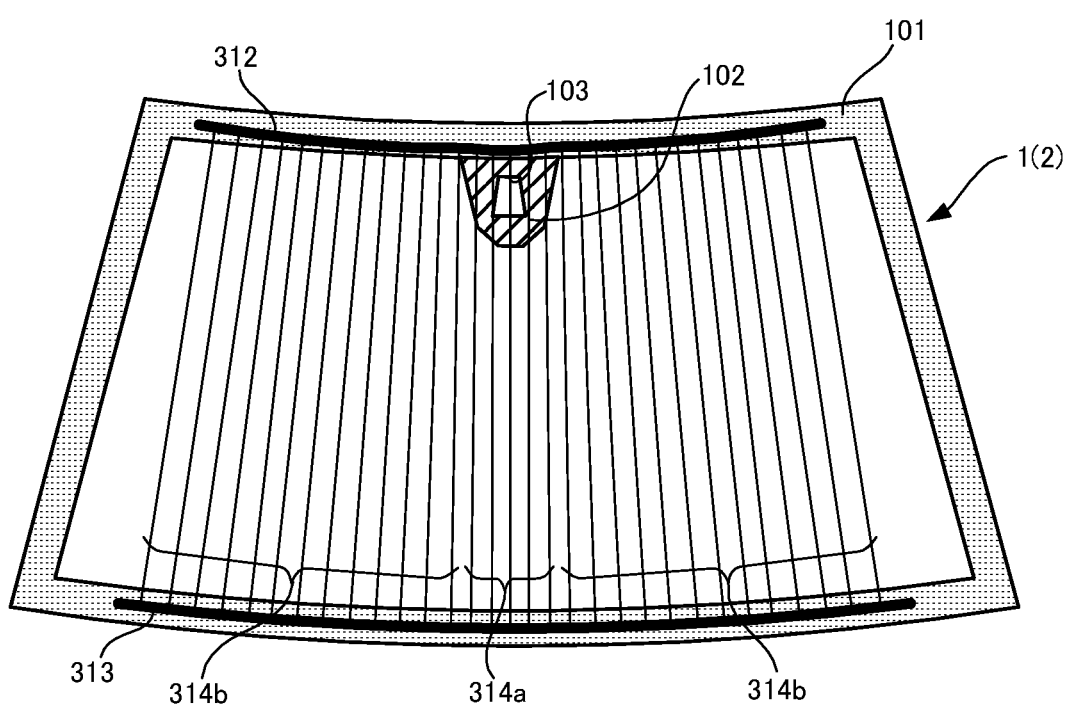
FIG. 20 is a front elevational view illustrating another example of the windshield.

As shown in FIG. 20, the first bus bar 312 can be arranged upward of the window portion 103. As a result, the heating lines 314 pass over the window portion 103, and the window portion 103 can be defogged reliably. In this case, the first bus bar 312 can be formed straightly or in a curved manner, along the upper sides of the glass plates 1 and 2.

5-9

Figure 21:
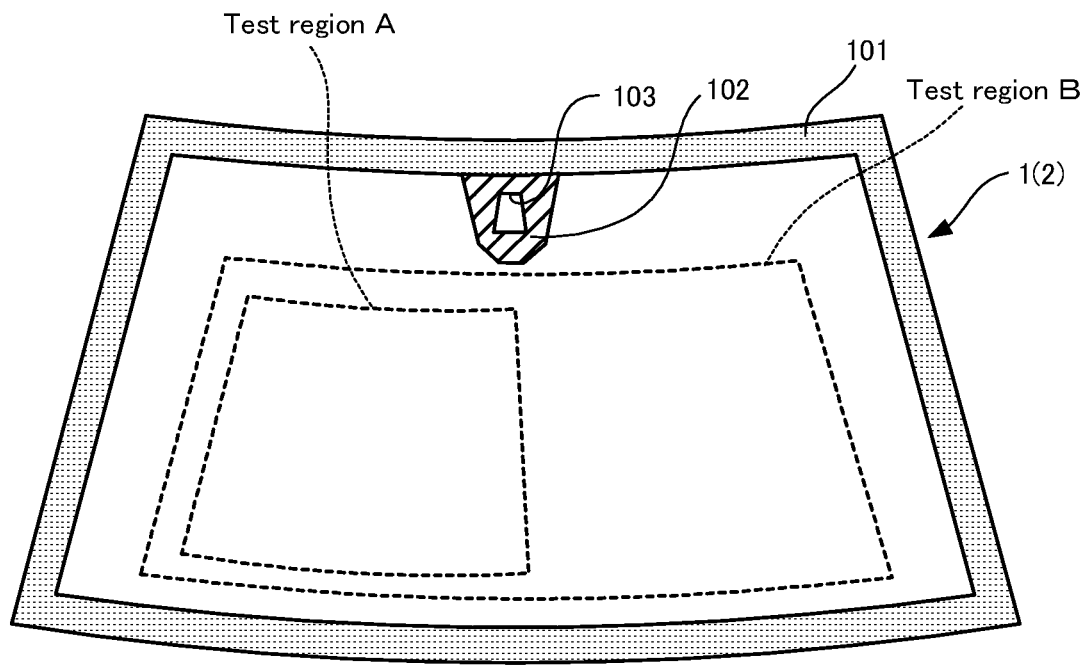
FIG. 21 is a front elevational view showing areas of a glass plate.

A configuration can also be employed in which a plurality of regions are set in each of the glass plates 1 and 2, and the line width of the heating lines 314 is differentiated between the regions. These regions can be set as follows, for example. First, in the windshield, an obstructing region with a window is formed, as shown in FIG. 21. Also, regions (test region A and test region B) are defined for testing predetermined optical properties, i.e. double image, perspective distortion, and color identification, conforming to JIS R3212. These test regions A and B are substantially as shown in FIG. 21. However, the test region A is a region in the case of a right-hand drive vehicle. Although FIG. 21 omits the bus bars 312 and 313 and the heating lines 314, these members can be configured similarly to those in FIGS. 18 to 20.

In the above-described windshield, for example, the test region A, the test region B, the region (information acquisition region) in which the window portion 103 is provided, and the remaining region are a first region, a second region, a third region, and a fourth region, respectively. The largest line width of the heating lines 314 arranged in the respective regions can be differentiated between these four regions. For example, if the first region and the second region are fogged, it may cause a problem during driving, and therefore, the defogging effect needs to be enhanced particularly in these regions. Accordingly, in these regions, the line width of the heating lines 314 can be particularly reduced to increase the amount of heat generation. Also, if the third region is fogged, there is a possibility that measurement is not performed correctly by the information acquisition device. Accordingly, the line width of the heating lines 314 arranged in the third region can also be reduced to increase the amount of heat generation.

As described above, for example, the largest line width of the heating lines 314 can be particularly reduced in the first to third regions, and the largest line width of the heating lines 314 in the fourth region can be made larger than that in the first to third regions. Also, the largest line width in the first, second, third, and fourth regions can also be increased in that order. Note that the region setting method is not limited thereto, and the regions can be set as appropriate in accordance with the usage or the like.

The largest line width is measured as follows. Initially, a current is flowed through the heating lines 314, and a portion in which the amount of heat generation is large and a portion in which the amount of heat generation is small are specified. Here, the reason for specifying both the portions with large and small amounts of heat generation is because the line width becomes largest or smallest in the case of connecting the heating lines 314 in series or in the case of connecting the heating lines 314 in parallel. The line width is measured using a microscope with a pitch of 10 mm in the portion with a large amount of heat generation and the portion with a small amount of heat generation, and the largest line width in this measurement is regarded as the largest line width.

5-10

The configuration of the glass plates 1 and 2 is not particularly limited either. For example, the aforementioned obstructing region may be formed by attaching a sheet material. The shape of the obstructing region is not particularly limited, and the bus bars can be arranged in correspondence with the obstructing region. The glass plates 1 and 2 can be curved not only due to their own weight as described above, but can also be curved by pressing these glass plates using a molding tool.

5-11

The above embodiment has described a windshield whose upper side is shorter, but the present invention can also be applied to a windshield those upper side is longer than the lower side. In this case, the length ratio between the upper side and the lower side can be 1:0.67 to 1:0.96, for example. That is to say, for example, if the length of the upper side is 500 mm, the length of the lower side can be 333 to 480 mm. Specifically, the length of the upper side may be 500 mm, and the length of the lower side may be 425 mm. Note that the aforementioned ratio is a ratio in a two-dimensional plane when the windshield is projected from the front side.

In this case, the line width of each heating line 314 increases further toward the lower side, and the ratio between the width at an upper end of the heating line 314 that is connected to the first bus bar 312 and the width of a lower end that is connected to the second bus bar 313 can be 1:1.04 to 1:1.5, for example. Also, the space between adjacent heating lines 314 decreases downward, and the ratio between the space at the upper end that is connected to the first bus bar 312 and the space at the lower end that is connected to the second bus bar 313 can be 1:0.67 to 1:0.96, for example.

5-12

The configuration of the heating lines 314 is not particularly limited, and various modes are possible. A description will be given of this point with reference to FIG. 22. The example in FIG. 22 differs from the above embodiment mainly in the arrangement of the bus bars and the heating lines. Accordingly, only differences will be described below, and the same constituent elements will be assigned the same reference numerals and will not be described.

Figure 22:
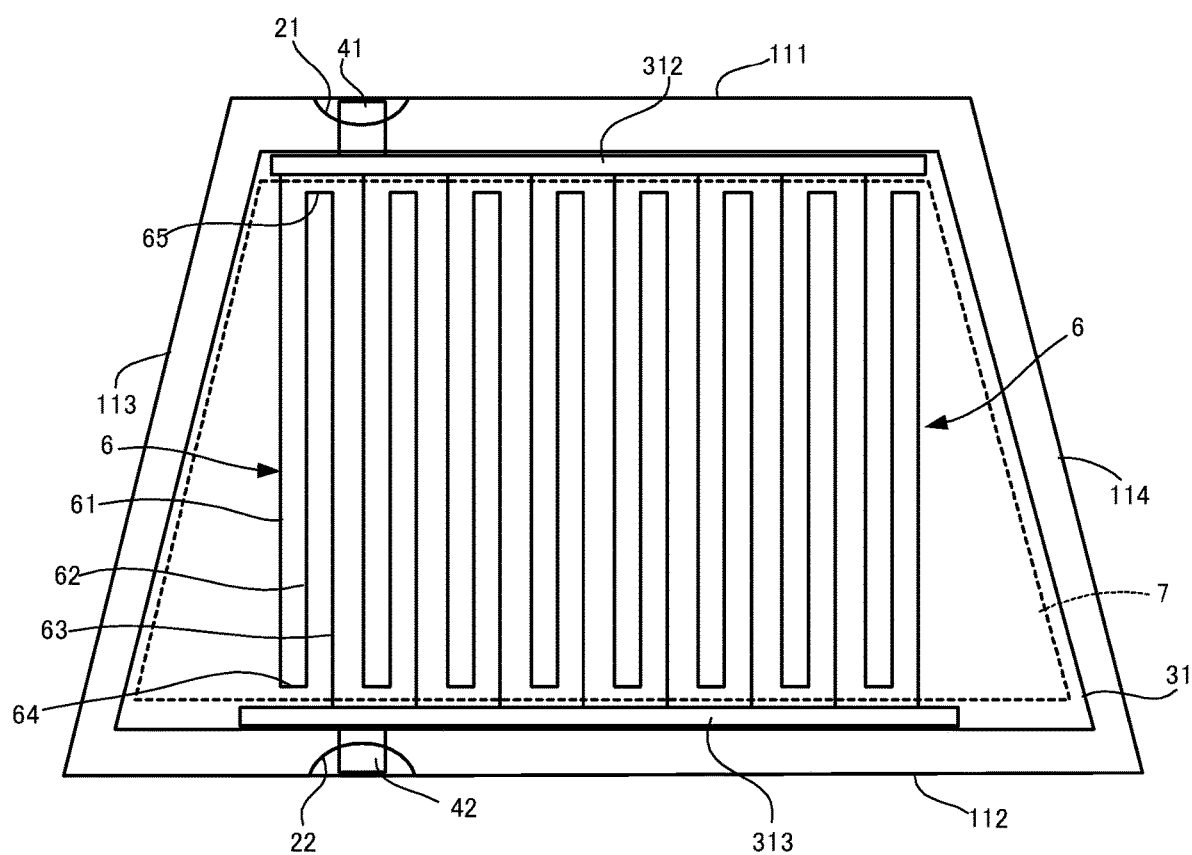
FIG. 22 is a front elevational view illustrating another example of the windshield.

As shown in FIG. 22, in this example, the plurality of heating lines 6 are arranged parallel to each other so as to connect the bus bars 312 and 313 to each other. Each heating line 6 includes three regions and two folding portions. That is to say, each heating line 6 includes a first region 61, which extends from the first bus bar 312 to a position close to the second bus bar 313, a second region 62, which extends upward from a lower end portion of the first region 61 via a first folding portion 64 and extends to a position close to the first bus bar 312, and a third region 63, which extends downward from an upper end portion of the second region 62 via a second folding portion 65 and is connected to the second bus bar 313. A plurality of heating lines 6 that are formed as described above are arranged with predetermined spaces therebetween in the left-right direction of the bus bars 312 and 313.

In this example, the heating lines 6 can be elongated by providing the folding portions 64 and 65 therein. This configuration can reduce the amount of heat generation by the heating lines 6.

Note that the mode of the heating lines 6 is not particularly limited. In this embodiment, each heating line 6 has the two folding portions 64 and 65. However, a configuration is also possible in which three or more folding portions are provided to further elongate the length of the heating lines 6 that extend between the bus bars 212 and 213.

5-13

Figure 23:
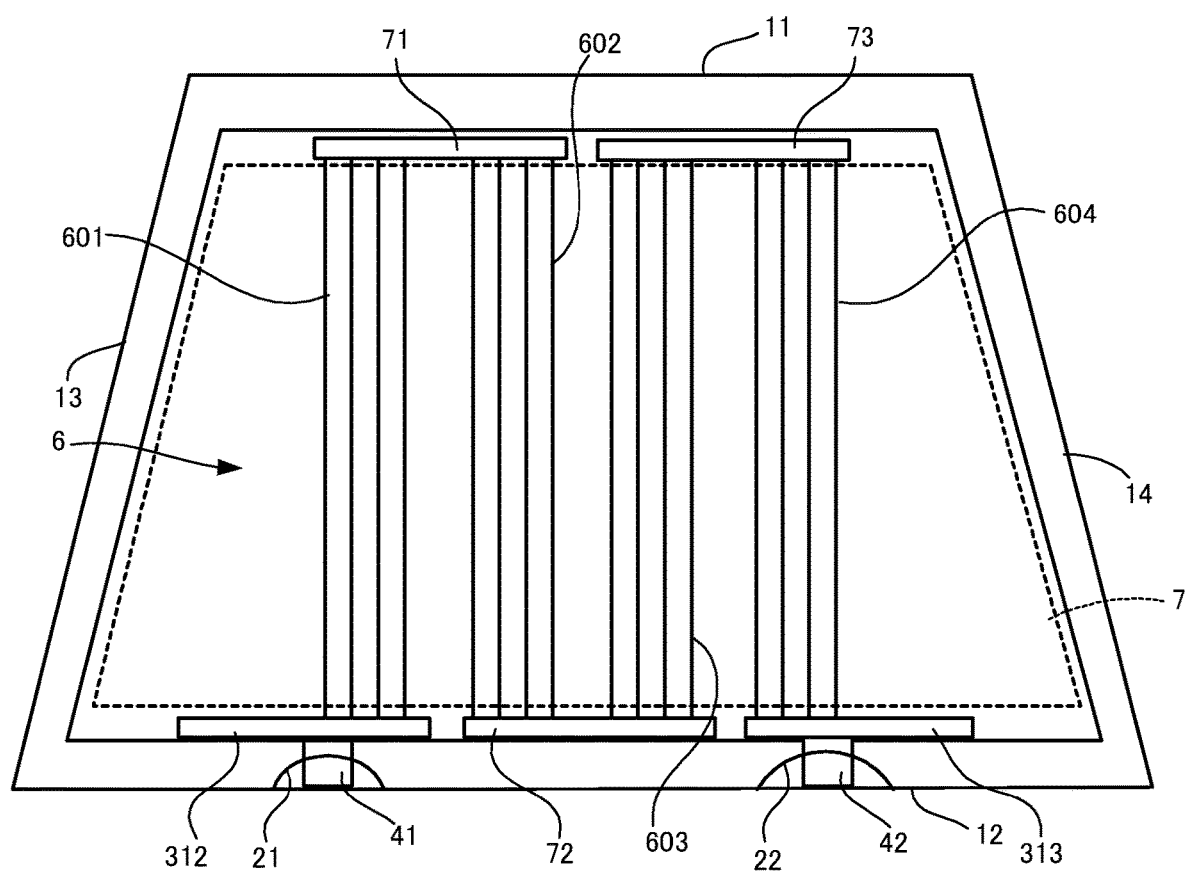
FIG. 23 is a front elevational view illustrating another example of the windshield.

To elongate the heating lines 6, relay bus bars such as those shown in FIG. 23 can also be provided. This point will be described in detail.

As shown in FIG. 23, in this windshield, the first bus bar 312 is arranged on the left side of lower sides 12 of the glass plates 1 and 2, and the second bus bar 313 is arranged on the right side of the lower sides 12. In addition, a band-shaped first relay bus bar 71 is provided on the left side of upper sides 11 of the glass plates 1 and 2. A band-shaped second relay bus bar 72 is provided on the lower side 12 between the first and second bus bars 312 and 313. A band-shaped third relay bus bar 73 is provided on the right side of the upper sides 11 of the glass plates 1 and 2. The first relay bus bar 71 is arranged at a position opposing the first bus bar 312 and the second relay bus bar 72, and has substantially the same length as the length from a left end portion of the first bus bar 312 to a portion around the center of the second relay bus bar 72. The third relay bus bar 73 is arranged at a position opposing the second relay bus bar 72 and the second bus bar 313, and has substantially the same length as the length from a left end portion of the first bus bar 312 to a portion around the center of the second relay bus bar 72.

The plurality of heating lines 6 are divided into four portions. That is to say, the plurality of heating lines 6 are divided into first portions 601 that connect the first bus bar 312 to the first relay bus bar 71, second portions 602 that connect the first relay bus bar 71 to the second relay bus bar 72, third portions 603 that connect the second relay bus bar 72 to the third relay bus bar 73, and fourth portions 604 that connect the third relay bus bar 73 to the second bus bar 313. The plurality of first portions 601 extend upward from the first bus bar 312 substantially parallel to each other, and are connected to the left half of the first relay bus bar 71. The plurality of second portions 602 extend downward from the right half of the first relay bus bar 71 substantially parallel to each other, and are connected to the left half of the second relay bus bar 72. The plurality of third portions 603 extend upward from the left half of the second relay bus bar 72 substantially parallel to each other, and are connected to the third relay bus bar 73. The plurality of fourth portions 604 extend downward from the right half of the third relay bus bar 73 substantially parallel to each other, and are connected to the second bus bar 213.

In this example, three relay bus bars 71 to 73 are provided between the first bus bar 312 and the second bus bar 313, and the plurality of heating lines 6 that are arranged parallel to each other via these relay bus bars connect the first bus bar 312 and the second bus bar 313 to each other. Accordingly, the length of the heating lines 6 between the first bus bar 312 and the second bus bar 313 can be elongated. This configuration can reduce the amount of heat generation by the heating lines 6.

Although, in this example, both bus bars 312 and 313 are arranged along the lower sides 12, the bus bars 312 and 313 can alternatively be arranged along the upper sides 11. That is to say, the bus bars 312 and 313 and the three relay bus bars 71 to 73 can be arranged at positions that are opposite, in the up-down direction, to those in FIG. 23. The number of relay bus bars is not particularly limited, and can be two, or can be four or more. Both end portions of the heating lines need only be connected to the first bus bar 312 and the second bus bar 313 through all of the relay bus bars.

5-14

Figure 24:
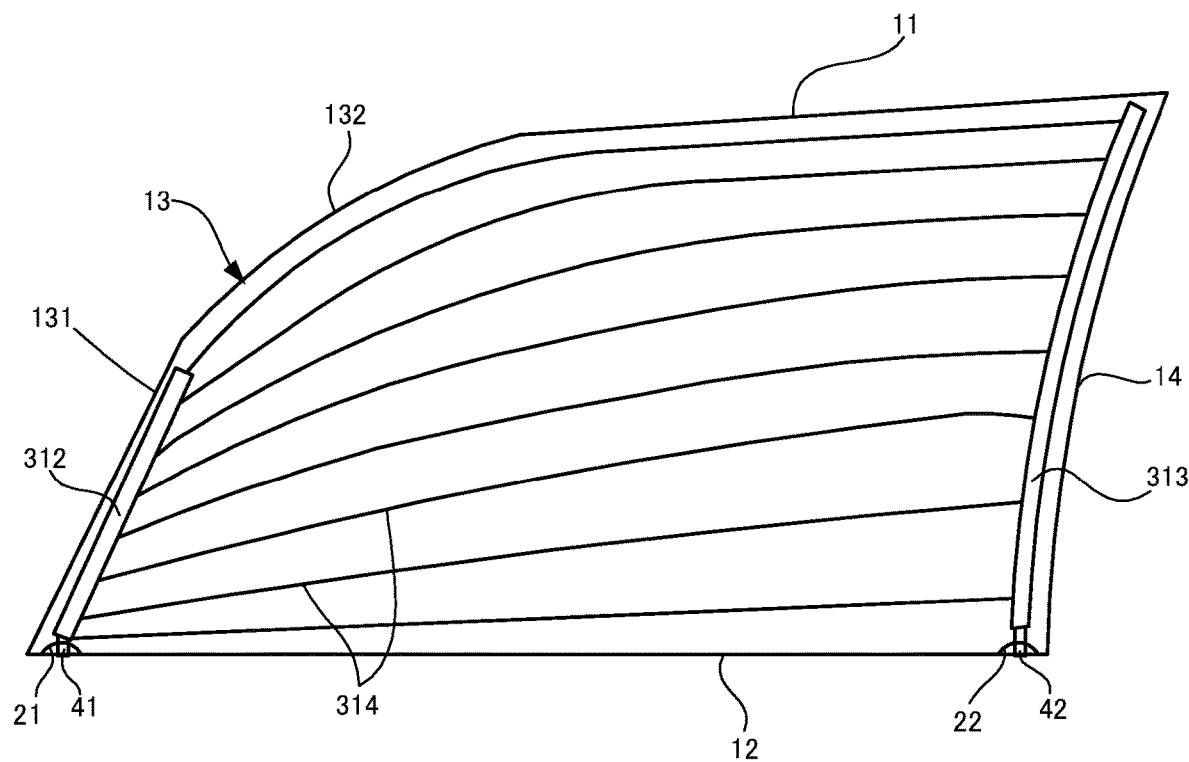
FIG. 24 is a front elevational view illustrating an example of side glass.

Although an example of applying the laminated glass to a windshield has been described above, the laminated glass can also be applied to side glass. As shown in FIG. 24, glass plates 1 and 2 that constitute this side glass are formed into a rectangular shape and each have an upper side 11, a lower side 12, a front side 13, and a rear side 14. Since both glass plates 1 and 2 have the same shape, the same reference numerals 11 to 14 that denote the respective sides are used for the glass plates 1 and 2 in the following description.

Here, the "rectangular shape" means a shape whose upper side 11, lower side 12, front side 13, and rear side 14 can be specified in its outer shape, and does not need to be a rectangle.

The upper side 11 and the lower side 12 are formed parallel to each other, and the upper side 11 is shorter than the lower side 12. The front side 13 includes a first portion 131, which extends upward so as to incline rearward from a front end of the lower side 12, and a second portion 132, which extends so as to incline further rearward from an upper end of the first portion 131. The rear side 14 extends upward while inclining rearward from a rear end of the lower side 12 while slightly curving, substantially parallel to the first portion 131 of the front side 13. Accordingly, the rear end of the upper side is located slightly rearward of the rear end of the lower side 12. As mentioned above, arc-shaped cutout portions 21 and 22 are formed, respectively, at a front end portion and a rear end portion of the lower side of the inner glass plate 2. In the following description, the cutout portion formed at the front end portion of the inner glass plate 2 will be referred to as a first cutout portion 21, and the cutout portion formed at the rear end portion will be referred to as a second cutout portion 22.

The side glass that is constituted by the above-described outer glass plate 1 and inner glass plate 2 is to be attached to a vehicle door, and is supported, raised, and lowered by a lifting module (regulator) (not shown in the diagram), which is provided inside the door. When the side glass has been raised and the window is closed, the lower side 12 of the side glass is located below a belt molding B of the door. Accordingly, the lower side 12 of the side glass cannot be seen from inside and outside the vehicle regardless of whether the window is open or closed. In the process of the side glass moving up, the first portion 131 of the front side 13 and the rear side 14 is supported by a guide (e.g. sash portion) of a door frame, and moves up and down along this guide. Accordingly, the first portion 131 of the front side 13 and the rear side 14 are accommodated in the guide, and accordingly cannot be seen from inside and outside the vehicle. When the window is closed, the second portion 132 of the front side 13 and the upper side 11 are also accommodated within the door frame, and cannot be seen from outside and inside the vehicle.

Next, an intermediate film that is arranged between the glass plates 1 and 2 will be described. The intermediate film also includes adhesion layers and a heat-generating layer, similarly to the above embodiment. Since the configuration of the adhesion layers is substantially the same, the heat-generating layer will be described below. The heat-generating layer 31 includes a sheet-shaped base 311, as well as a first bus bar 312, a second bus bar 313, and a plurality of heating lines 314, which are arranged on the base 311. The base 311 can be formed in correspondence with the glass plates 1 and 2, but may not necessarily have the same shape as the shape of the glass plates 1 and 2, and may also be smaller than the glass plates 1 and 2. For example, as shown in FIG. 1, the length of the base 311 in the up-down direction can be shorter than the length of the glass plates 1 and 2 in the up-down direction so as not to interfere with the cutout portions 21 and 22 of the inner glass plate 2. Also, the length of the base 311 in the left-right direction can also be shorter than the width of the glass plates 1 and 2.

The bus bars 312 and 313 are formed into a band shape, and the first bus bar 312 is formed to extend on the base 311 along the first portions 131 of the front sides 13 of the glass plates 1 and 2. Meanwhile, the second bus bar 313 is formed to extend on the base 311 along the rear sides 14 of the glass plates 1 and 2. However, lower end portions of the bus bars 312 and 313 are arranged above the cutout portions 21 and 22, respectively, so as not to be exposed from the aforementioned cutout portions 21 and 22 when the intermediate film 3 is sandwiched between the glass plates 1 and 2. The width of the bus bars 312 and 313 in the front-rear direction is substantially as described above.

The plurality of heating lines 314 are formed to extend in the front-rear direction so as to connect the bus bars 312 and 313 to each other. The plurality of heating lines 314 are formed to extend parallel to each other, but not all of the heating lines 314 are arranged parallel to each other. For example, the lowermost heating line extends along the lower sides 12 so as to connect the lower end portion of the first bus bar 312 to the lower end portion of the second bus bar 313. Meanwhile, the uppermost heating line 314 extends from the upper end portion of the first bus bar 312 to the upper end portion of the second bus bar 313 along the second portion 132 of the front side 13 and the upper side 11. That is to say, since the first bus bar 312 is shorter than the second bus bar 313 in the up-down direction, the plurality of heating lines 314 extend rearward so that the space between adjacent heating lines 314 substantially expand. Accordingly, the plurality of heating lines 314 have different lengths. However, the plurality of heating lines 314 may alternatively have the same length.

The amount of heat generation within this side glass can also be changed. For example, it is possible to increase the amount of heat generation in a region close to the front side 13 in which a door mirror is arranged, and decrease the amount of heat generation in the other region. For this purpose, the width of the heating lines 314, the space between adjacent heating lines 314, or the like can be changed as described above.

5-15

The above-described mode of the heating lines is as follows.
(1) In the case where the space between adjacent heating lines expands downward from above, the width of the heating lines narrows downward. Conversely, in the case where the space between adjacent heating lines narrows downward from above, the width of the heating lines expands downward.
(2) In the case where the space between adjacent heating lines is fixed, that is, in the case where the heating lines are arranged parallel to each other, the width of the heating lines is fixed.
(3) In the case where the heating lines have different lengths, the width of a shorter heating line is smaller than the width of a longer heating line.

Heating lines formed by combining (1) to (3) above as appropriate can be arranged. As for the length of the heating lines, the length varies due to providing the aforementioned obstructing region or window portion, or the length of some of the heating lines can be changed based on the shape of the glass plates or the like.

In the example shown in FIG. 1, the laminated glass is formed into a trapezoidal shape, and the space between adjacent heating lines 314 expands downward. For this reason, the length of the heating lines 314 arranged on both sides are slightly longer than the length of the heating lines 314 arranged on the center side. Accordingly, according to (3) above, the width of the heating lines 314 on both sides can be made larger than the width of the heating lines 314 on the center side.

Also, the amount of heat generation in a plurality of regions in the laminated glass can be differentiated by arranging heating lines that are formed by combining (1) to (3) above as appropriate.

Not all heating lines have to have different lengths. For example, since the laminated glass in the above embodiment is symmetrical in the left-right direction, the heating lines arranged on both sides of the center in the left-right direction may have the same length. Similarly, the modes (1) to (3) above do not have to be applied to all of the heating lines, and may be applied to only some of the heating lines.

The shape of the laminated glass may not be a trapezoidal shape as described above, and the upper side and the lower side thereof may have the same length. In this case, the heating lines can be arranged parallel to each other.

5-16

The above embodiment has described an example of applying the laminated glass according to the present invention to a windshield of an automobile. However, the invention is not limited thereto, and can also be applied to window glass of another vehicle such as a train, or of a building.

LIST OF REFERENCE NUMERALS

1 Outer glass plate
2 Inner glass plate
3 Intermediate film
31. Heat-generating layer
311 Base
312 First bus bar
313 Second bus bar
314 Heating line

The invention claimed is:

1. Laminated glass comprising:
a first glass plate having a rectangular shape, and including a first side and a second side opposing the first side;
a second glass plate arranged opposing the first glass plate, and having substantially the same shape as the shape of the first glass plate; and
an intermediate film arranged between the first glass plate and the second glass plate,
the intermediate film comprising:
a first bus bar extending along an end portion closer to the first side;
a second bus bar extending along an end portion closer to the second side; and
a plurality of heating lines extending so as to connect the first bus bar and the second bus bar to each other,
wherein at least some of the plurality of heating lines are heating lines having different lengths,
the laminated glass comprises:
an information acquisition region opposing an information acquisition device for acquiring information from outside of a vehicle by emitting and/or receiving light, the light passing through the information acquisition region;
a central region between the information acquisition region and the second side;
side regions on both sides of the information acquisition region, between the first side and the second side;
test regions defined by JIS R3212;
a fourth region that is a region other than the test regions and the information acquisition region;
wherein the heating lines arranged in the central region pass over the information acquisition region,
the length of the heating lines arranged in the central region is shorter than the length of the heating lines arranged in the side regions,
the width of the heating lines arranged in the central region is larger than the width of the heating lines arranged in the side regions, and
the amount of heat generation in the information acquisition region is larger than that in the fourth region.

2. The laminated glass according to claim 1, wherein at least some of the heating lines having a longer length have a width larger than the width of the heating lines having a shorter length.

3. The laminated glass according to claim 1, wherein the intermediate film further comprises:
an adhesion layer; and
a heat-generating layer including at least the heating lines, the heat-generating layer being in contact with the adhesion layer or arranged inward of the adhesion layer, and
the adhesion layer is formed with a material capable of deforming to follow the shape of the heating lines.

4. The laminated glass according to claim 1, wherein at least one of the length and width of the plurality of heating lines and the space therebetween differs so that a plurality of regions with different amounts of heat generation are formed in a first direction in which the first side and the second side face each other, between the first bus bar and the second bus bar.

5. The laminated glass according to claim 1,
wherein the central region includes a plurality of portions with different amounts of heat generation, the plurality of portions being arranged in a first direction in which the first side and the second side face each other, and
of the plurality of portions, a portion on the information acquisition region side has an amount of heat generation larger than that of a portion closer to the second side.

6. The laminated glass according to claim 5,
wherein each of the heating lines has a plurality of portions with different widths in a length direction, and
the curvature radius at corners of a connecting region between adjacent ones of the plurality of portions, the corners being formed at both side edges of a wider portion, is 1 µm or larger.

7. The laminated glass according to claim 5,
wherein each of the heating lines has a plurality of portions with different widths in a length direction, and
the curvature radius at corners of a connecting region between adjacent ones of the plurality of portions, the corners being formed by both side edges of a narrower portion and a wider portion, is 1 µm or larger.

8. The laminated glass according to claim 6, wherein each of the portions is formed so that the width changes in the length direction.

9. The laminated glass according to claim 5, wherein the intermediate film further comprises:
an adhesion layer; and
a heat-generating layer including at least the heating lines, the heat-generating layer being arranged inward of the adhesion layer, and
the adhesion layer is formed with a material capable of deforming to follow the shape of the heating lines.

10. The laminated glass according to claim 1, wherein, of the first bus bar, a first portion corresponding at least to the information acquisition region is arranged closer to the second side than the information acquisition region.

11. The laminated glass according to claim 10, wherein the first bus bar includes the first portion and second portions corresponding to the side regions, and
the second portions are arranged closer to the first side than the first region.

12. The laminated glass according to claim 1, wherein, of the first bus bar, a first portion corresponding at least to the information acquisition region is arranged closer to the first side than the information acquisition region.

13. The laminated glass according to claim 1,
wherein the second sides of the first glass plate and the second glass plate are formed longer than the first sides,
the first bus bar, the second bus bar, and the plurality of heating lines are arranged between the first glass plate and the second glass plate,
at least one of spaces between adjacent ones of the heating lines is narrower on the first bus bar side than on the second bus bar side, and
the line width of at least one of the heating lines is larger on the first bus bar side than on the second bus bar side.

14. The laminated glass according to claim 1, wherein at least a pair of adjacent heating lines further comprises at least one bypass heating line that connects the pair of adjacent heating lines.

15. The laminated glass according to claim 1, wherein the first bus bar, the second bus bar, and the plurality of heating lines are integrally formed with the same material.

16. The laminated glass according to claim 1, wherein the line width of the heating lines is 500 μm or smaller.

17. The laminated glass according to claim 1, wherein the first side is an upper side or a lower side.

18. The laminated glass according to claim 1, further comprising:
an obstructing region for obstructing a field of view, the obstructing region being provided in at least one of a first face and a second face of the first glass plate and a first face and a second face of the second glass plate,
wherein the first and second bus bars are arranged at positions overlapping the obstructing region.

19. The laminated glass according to claim 1, wherein, in a connecting portion between the bus bars and the heating lines, the width of the heating lines is formed wider than that in another portion.

* * * * *